United States Patent
Nakatani et al.

(10) Patent No.: US 12,190,912 B2
(45) Date of Patent: Jan. 7, 2025

(54) SLIDE SHOW GENERATION METHOD, RECORDING MEDIUM, AND SLIDE SHOW GENERATION DEVICE

(71) Applicant: Panasonic Intellectual Property Management Co., Ltd., Osaka (JP)

(72) Inventors: Tokuo Nakatani, Osaka (JP); Shota Kubo, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 132 days.

(21) Appl. No.: 18/024,665

(22) PCT Filed: Sep. 7, 2021

(86) PCT No.: PCT/JP2021/032761
§ 371 (c)(1),
(2) Date: Mar. 3, 2023

(87) PCT Pub. No.: WO2022/065018
PCT Pub. Date: Mar. 31, 2022

(65) Prior Publication Data
US 2023/0282242 A1      Sep. 7, 2023

(30) Foreign Application Priority Data

Sep. 25, 2020   (JP) ................................ 2020-161454

(51) Int. Cl.
*G11B 27/031*       (2006.01)
*G06V 20/40*        (2022.01)

(52) U.S. Cl.
CPC ............ *G11B 27/031* (2013.01); *G06V 20/41* (2022.01); *G06V 20/44* (2022.01)

(58) Field of Classification Search
CPC ..... G11B 27/031; G11B 27/034; G11B 27/28; G06V 20/41; G06V 20/44; H04N 21/44008; H04N 21/8456; H04N 21/440236
(Continued)

(56) References Cited

U.S. PATENT DOCUMENTS

| | | | |
|---|---|---|---|
| 2009/0067815 A1 | 3/2009 | Tsutsui | |
| 2011/0016398 A1* | 1/2011 | Hanes | G11B 27/105 715/730 |

(Continued)

FOREIGN PATENT DOCUMENTS

| | | |
|---|---|---|
| JP | 2006-279118 A | 10/2006 |
| JP | 2010-004479 A | 1/2010 |

(Continued)

OTHER PUBLICATIONS

English_Translation_of_Japanese_Publication_JP2010004479_ Jan. 2010 (Year: 2010).*

(Continued)

*Primary Examiner* — Loi H Tran
(74) *Attorney, Agent, or Firm* — Rimon P.C.

(57) ABSTRACT

A slide show generation method according to the present disclosure includes: obtaining a plurality of video data items; classifying first video data items, among the plurality of video data items, which were generated at the same generation location on the same generation date into the first group; classifying, into the first group, a second video data item among the plurality of video data items which was generated between the generation dates and times, in chronological order, of any two first video data items among the first video data items belonging to the first group; and selecting one or more video data items from among a plurality of video data items which belong to the first group (Continued)

and each of which is a first video data item or a second video data item, and generating slide show data for sequentially playing back the selected one or more video data items.

14 Claims, 15 Drawing Sheets

(58) Field of Classification Search
 USPC .......................................................... 386/278
 See application file for complete search history.

(56) References Cited

U.S. PATENT DOCUMENTS

| | | |
|---|---|---|
| 2011/0249166 A1 | 10/2011 | Moriyama |
| 2011/0305395 A1 | 12/2011 | Takayama et al. |
| 2012/0251081 A1 | 10/2012 | Kawaguchi et al. |
| 2019/0005697 A1* | 1/2019 | Mitsumoto ............ G06V 20/30 |

FOREIGN PATENT DOCUMENTS

| | | |
|---|---|---|
| JP | 2011-223465 A | 11/2011 |
| JP | 2015-008385 A | 1/2015 |

OTHER PUBLICATIONS

English_Translation_of_Japanese_Publication_JP2015008385_ Jan. 2015 (Year: 2015).*
Extended European Search Report dated Feb. 2, 2024 issued in the corresponding European Patent Application No. 21872149.6.
International Search Report issued on Nov. 22, 2021 in International Patent Application No. PCT/JP2021/032761, with English translation.

* cited by examiner

SLIDE SHOW GENERATION METHOD, RECORDING MEDIUM, AND SLIDE SHOW GENERATION DEVICE

CROSS-REFERENCE OF RELATED APPLICATIONS

This application is the U.S. National Phase under 35 U.S.C. § 371 of International Patent Application No. PCT/JP2021/032761, filed on Sep. 7, 2021, which in turn claims the benefit of Japanese Patent Application No. 2020-161454, filed on Sep. 25, 2020, the entire disclosures of which Applications are incorporated by reference herein.

TECHNICAL FIELD

The present disclosure relates to a slide show generation method, a recording medium, and a slide show generation device.

BACKGROUND ART

Patent Literature (PTL) 1 discloses an image playback device that sequentially and switchingly displays images. The image playback device stores and manages, for each of the images, relevant information associated with the image, refers to the relevant information for each image to evaluate the image, extracts a predetermined number of images in descending order of evaluation based on the evaluation result, and sequentially and switchingly displays the extracted images. This enables the image playback device to select a predetermined number of images appropriate for playback and sequentially and switchingly play back the selected images, without requiring, in advance, the user to select images they desire to play back while checking many images.

CITATION LIST

Patent Literature

[PTL 1] Japanese Unexamined Patent Application Publication No. 2006-279118

SUMMARY OF INVENTION

Technical Problem

The present disclosure provides a slide show generation method and other related techniques capable of selecting video data appropriate for playback.

Solution to Problem

A slide show generation method according to the present disclosure includes: obtaining a plurality of video data items; classifying, into a first group, a first video data item among the plurality of video data items obtained in the obtaining, where a plurality of first video data items were generated at a generation location that is same among the plurality of first video data items on a generation date that is same among the plurality of first video data items, and each of the plurality of first video data items is the first video data item; classifying, into a first group, a second video data item among the plurality of video data items obtained in the obtaining, where the second video data item is a video data item that does not include location information and was generated between generation dates and times, in chronological order, of any two first video data items among the plurality of first video data items belonging to the first group, and the location information indicates a generation location of the video data item; and selecting one or more video data items from among a plurality of video data items each of which is the first video data item or the second video data item, and generating slide show data for sequentially playing back the one or more video data items selected.

One aspect of a program according to the present disclosure is a computer-readable non-transitory recording medium having recorded thereon a program for causing a computer to execute the slide show generation method according to the present disclosure.

A slide show generation device according to the present disclosure includes: an obtainer that obtains a plurality of video data items; a first classifier that classifies, into a first group, a first video data item among the plurality of video data items obtained by the obtainer, where a plurality of first video data items were generated at a generation location that is same among the plurality of first video data items on a generation date that is same among the plurality of first video data items, and each of the plurality of first video data items is the first video data item; a second classifier that classifies, into the first group, a second video data item among the plurality of video data items obtained by the obtainer, where the second video data item is a video data item that does not include location information and was generated between generation dates and times, in chronological order, of any two first video data items among the plurality of first video data items belonging to the first group, and the location information indicates a generation location of the video data item; and a generator that selects one or more video data items from among a plurality of video data items each of which is the first video data item or the second video data item, and generates slide show data for sequentially playing back the one or more video data items selected.

Advantageous Effects of Invention

With the slide show generation method according to the present disclosure, it is possible to select video data appropriate for playback.

DESCRIPTION OF EMBODIMENTS

Figure 1:
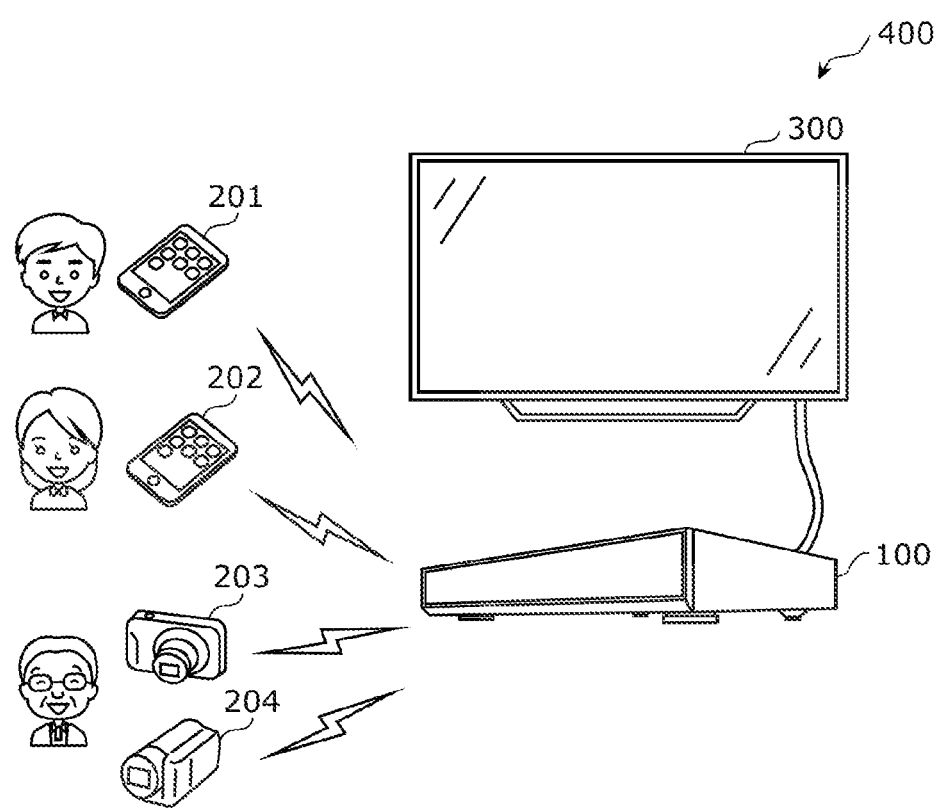
FIG. 1 is a schematic diagram illustrating the configuration of a slide show generation system according to an embodiment.

Underlying Knowledge Forming Basis of the Present Disclosure

First, viewpoints of the inventors will be described below.

There has conventionally been a device equipped with a function to analyze a video data item such as an image data item and a moving image data item, and generate slide show data for sequentially playing back a plurality of video data items using the result of the analysis. Alternatively, there has been a device that generates slide show data based on dates and times when video data items were generated and sends a notification to the user. For example, a display device such as a monitor determines an order in which a plurality of video data items are displayed, based on slide show data, and sequentially displays (plays back) the plurality of video data items in the determined order. In other words, a display device such as a monitor displays a slide show (also referred to as a short movie) based on the slide show data. These functions to generate slide show data are targeted at individuals and are used in devices such as smartphones owned by individuals.

Conventionally, a device such as a recorder shared by a group such as a family has a function to import video data such as pictures (image data) and moving pictures (moving image data) captured by, for instance, a smartphone or a digital camera owned by an individual. Unfortunately, even though video data is imported into the device, the current situation does not allow the user to effectively make use of the video data.

In view of this, the following focuses on a function to display video data imported by the device to the user as a slide show attractive to the user.

For example, a case where a family attends a field day or goes on a trip is considered. In recent years, each member of the family takes pictures or moving pictures using a smartphone or digital camera owned by the member himself/herself in many cases. Therefore, data items of pictures or moving pictures (i.e., video data items) obtained by each family member capturing objects of his/her interest are recorded on the smartphone or digital camera of his/her own.

By generating slide show data using video data items recorded on these smartphones or digital cameras, and displaying video data items generated from the viewpoint of each family member on, for instance, a display device, it is possible to wholly look back, in family, on a family event such as a field day or a trip, for instance.

With a device that generates slide show data using a plurality of video data items, it is possible to show video data items to the user without requiring the user to generate slide show data themselves or instructing the display device to display the video data items.

For example, a slide show generation device that generates this type of slide show data imports video data items from each of a plurality of devices, performs image analysis (or video analysis) on all of the imported video data items, and determines objects in or the event of each video data item. The slide show generation device generates slide show data indicating an order in which video data items that are in accordance with the determined objects or event are played back. For example, the slide show generation device sends a notification to the user when power is turned ON, and causes the display device to sequentially display the video data items, i.e., a slide show, based on the generated slide show data. This allows the user watching the slide show to look back on a family event or enjoy watching the slide show in family.

A plurality of video data items may include video data items of different events. In order to generate slide show data from such video data items, it is important to properly classify the video data items for each of the events and generate slide show data for each of the classified video data items.

In some cases, however, it is difficult to properly classify a plurality of video data items for each event. Specifically, it may be difficult for the slide show generation device to import video data items generated by each of a plurality of devices such as smartphones and generate slide show data based on the imported video data items.

For example, a video data item may include (associate) a date and time when the video data item was generated, and global positioning system (GPS) data indicating a location where the video data item was generated. The recording format of GPS data, however, may be different depending on a device. In this case, even when the slide show generation device attempts to obtain video data items from each of devices, classify each of the video data items based on GPS data associated with each of the obtained video data items, and generate slide show data for each of the classified video data items, the slide show generation device may not be able to read the GPS data. Particularly, for moving image data, there is no common standard like an exchangeable image file format (EXIF) for image data, and a data standard regarding shooting conditions may be different depending on a device.

There is therefore a problem that the slide show generation device cannot properly classify each of the video data items based on shooting conditions such as date and time, and place of shooting, and thus cannot generate slide show data.

In view of the above, the inventors have come to conceive an invention according to the present disclosure.

Hereinafter, each of embodiments will be described in detail with reference to the drawings. However, description that is detailed to an extent more than necessary may be omitted. For example, detailed description of matters that are already well-known or overlapping description of substantially same elements may be omitted in order to avoid unnecessarily redundant description and thus make it easier for persons skilled in the art to understand the present disclosure.

The inventors provide the attached drawings and the following description for persons skilled in the art to fully understand the present disclosure, and the subject matters recited in the scope of the claims are not intended to be limited by the drawings and the description.

Embodiment

1. Configuration

Figure 2:
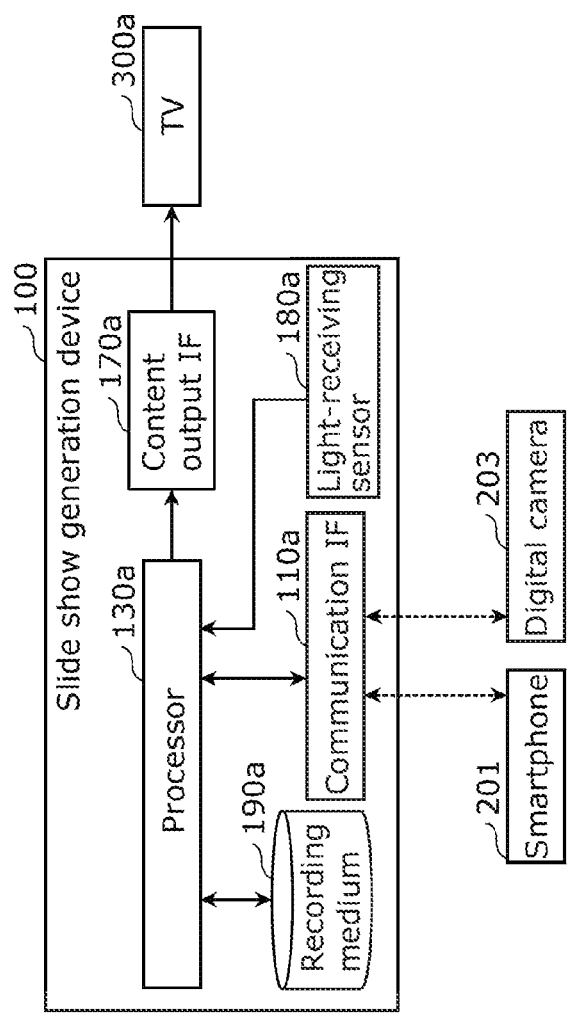
FIG. 2 is a diagram illustrating the hardware configuration of a slide show generation device according to the embodiment.
Figure 3:
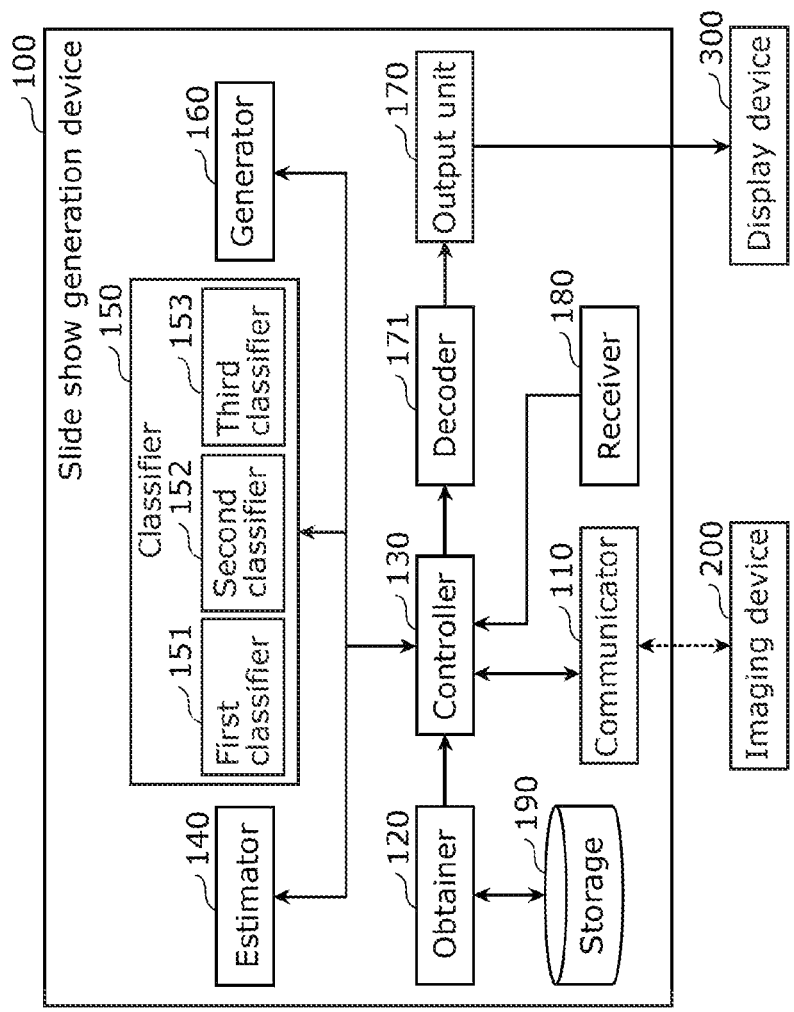
FIG. 3 is a block diagram illustrating the functional configuration of a slide show generation device according to the embodiment.

FIG. 1 is a schematic diagram illustrating the configuration of slide show generation system 400 according to an embodiment. FIG. 2 is a diagram illustrating the hardware configuration of slide show generation device 100 according to the embodiment. FIG. 3 is a block diagram illustrating the functional configuration of slide show generation device 100 according to the embodiment.

Slide show generation system 400 is a system that classifies (groups) a plurality of video data items into a plurality of groups based on a predetermined condition, generates slide show data indicating an order in which a display device sequentially displays (plays back) video data items for each of the groups, so that the display device sequentially displays the video data items (i.e., plays back a slide show) based on the generated slide show data.

Slide show generation system 400 includes slide show generation device 100, imaging device 200, and display device 300. Each of smartphone 201, smartphone 202, digital camera 203, and video camera 204 illustrated in FIG. 1 is one example of imaging device 200.

Slide show generation device 100 obtains video data items from each of smartphone 201, smartphone 202, digital camera 203, and video camera 204. In other words, slide show generation device 100 obtains video data items from each of a plurality of imaging devices 200. Although FIG. 3 illustrates one imaging device 200, the number of imaging devices 200 from which slide show generation device 100 obtains video data items may be two, or three or more.

In the present embodiment, a video data item is an image data item or a moving image data item.

Imaging device 200 is a device that generates and stores video data items by capturing images of an object, and communicates with slide show generation device 100 to transmit the stored video data items to slide show generation device 100. Imaging device 200 is, for example, smartphones 201, 202, digital camera 203, video camera 204.

Slide show generation device 100 generates slide show data indicating the playback order of a plurality of video data items obtained based on predetermined processing steps to be described later. Slide show generation device 100 also causes display device 300 to sequentially display the video data items based on the playback order indicated by the generated slide show data.

Display device 300 is a device that displays a video which is images or moving images, based on video data items. Display device 300 is, for example, a monitor device such as a liquid crystal display or an organic electroluminescent (EL) display. Display device 300 sequentially displays videos based on, for example, video data items sequentially output from slide show generation device 100.

Slide show generation device 100 is, for example, a device implemented by a Blu-ray Disc (BD) (registered trademark) player, a recorder, a gaming device, a personal computer, any other equivalent device.

As illustrated in FIG. 2, slide show generation device 100 is implemented by, for example, communication IF 110a, processor 130a, content output IF 170a, light-receiving sensor 180a, and recording medium 190a.

Communication IF 110a is a communication interface for communicating with, for instance, smartphone 201 or digital camera 203. Communication IF 110a is implemented by, for example, an antenna and a wireless communication circuit. A communications standard used when slide show generation device 100 communicates with, for instance, smartphone 201 or digital camera 203 is not specifically limited. For example, slide show generation device 100 communicates with, for instance, smartphone 201 or digital camera 203 based on Bluetooth (registered trademark) standard.

Processor 130a is a processor that controls each of elements included in slide show generation device 100.

Content output IF 170a is a connector to which a communication line for communicating with TV 300a which is one example of display device 300 is connected. Processor 130a transmits, for example, contents such as video data and audio data stored in recording medium 190a to TV 300a via content output IF 170a, to cause TV 300a to output video and audio of the contents.

Light-receiving sensor 180a is a sensor that receives an optical signal such as infrared light from a device such as a keyboard operated by the user. Processor 130a performs various processing based on, for example, an optical signal received by light-receiving sensor 180a, i.e., based on instructions from the user.

Recording medium 190a is a storage device that stores information such as video data items and a control program executed by processor 130a. Recording medium 190a is, for example, read only memory (ROM), random access memory (RAM), a hard disk drive (HDD), or a solid state drive (SSD).

As illustrated in FIG. 3, slide show generation device 100 includes, for example, communicator 110, obtainer 120, controller 130, estimator 140, classifier 150, generator 160, output unit 170, decoder 171, receiver 180, and storage 190, as functional elements.

Communicator 110 is a communication interface for communicating with imaging device 200. Communicator 110 is implemented by, for example, communication IF 110a. Communicator 110 may perform wireless communication or wired communication via a communication line. A communications standard used when communicator 110 communicates with imaging device 200 may be any standard. For example, controller 130 causes storage 190 to store, via obtainer 120, video data items obtained via communicator 110.

Obtainer 120 is a processing unit that obtains a plurality of video data items stored in storage 190.

Controller 130 is a processing unit that controls each of elements included in slide show generation device 100.

Estimator 140 is a processing unit that performs image analysis on each of video data items obtained by obtainer 120, to estimate the event type of the video data item. An event type is, for example, an event such as a trip, a field day, an outing such as shopping, etc. Estimator 140 performs image analysis on a video data item to estimate whether the video data item is a video data item generated during a trip (i.e., a video data item captured during a trip), or a video data item generated on a field day (i.e., a video data item captured on a field day), or a video data item generated during an outing such as shopping (i.e., a video data item captured during an outing). For example, estimator 140 performs image analysis on a video data item to calculate possibility (probability) of what the event type of the video data item is, such as probability that the event type of the video data item is a trip is 80% and probability that the event type of the video data item is a field day is 20%. Event types estimated by estimator 140 may be discretionarily determined in advance.

Classifier 150 is a processing unit that classifies video data items obtained by obtainer 120 into a plurality of groups. Classifier 150 classifies, for example, the video data items obtained by obtainer 120, for each of event types estimated by estimator 140. For example, classifier 150 classifies a video data item whose event type is a trip into group A and classifies a video data item whose event type is a field day into group B, to classify a video data item for each event type.

Classifier 150 includes, for example, first classifier 151, second classifier 152, and third classifier 153.

First classifier 151 is a processing unit that classifies image data items among video data items. For example, first classifier 151 classifies image data items (also referred to as first video data items), among a plurality of video data items obtained by obtainer 120, that were generated at the same location on the same date into the same group (e.g., the first group).

For example, first classifier 151 calculates the distance between a predetermined first location and the generation location of each of the first image data items among the plurality of video data items obtained by obtainer 120. In this case, first classifier 151 classifies a near-distance first video data item and a far-distance first video data item into different groups. The near-distance first video data item is a first video data item whose calculated distance is less than a predetermined first distance, and the far-distance first video data item is a first video data item whose calculated distance is at least the predetermined first distance.

Although the predetermined first distance is determined in advance as, for example, 10 km, 30 km, 100 km, etc., any distance may be set for the predetermined first distance.

Second classifier 152 is a processing unit that classifies moving image data items among video data items. For example, second classifier 152 classifies, into the first group, a second video data item (a moving image data item in the present embodiment) among the plurality of video data items obtained by obtainer 120. The second video data item is a video data item that does not include location information indicating the generation location of the video data item, and was generated between the generation dates and times, in chronological order, of any two first video data items among a plurality of first video data items belonging to a certain group (e.g., the first group). More specifically, second classifier 152 classifies, into a group that includes a first video data item with a generation date and time closest to the generation date and time of the second video data item among the plurality of video data items obtained by obtainer 120, the second video data item generated between the generation dates and times, in chronological order, of any two first video data items among the plurality of first video data items belonging to the group.

Location information is preferably information that can identify the location of a video data item and is not specifically limited. The location information may be, for example, GPS data (coordinates data) or information that can identify an area such as "Japan" or "Osaka".

Hereinafter, description is provided assuming that a video data item that includes location information is an image data item and a video data item that does not include location information is a moving image data item.

For example, a video data item includes identification data indicating imaging device 200 that has generated the video data item. In this case, second classifier 152 classifies the second video data item into the first group when (i) the generation date and time of the second video data item is between the generation dates and times, in chronological order, of any two first video data items among a plurality of first video data items belonging to the first group, and (ii) imaging device 200 indicated by identification data included in the second video data item is same as imaging device 200 indicated by identification data included in each of the plurality of the first video data items belonging to the first group, for example.

It is assumed, for example, that image data items belonging to the first group were generated by digital camera 203 and a moving image data item was also generated by digital camera 203. In this case, when the moving image data item was generated on the same date as the image data items, for example, second classifier 152 classifies the moving image data item into the first group. It is assumed, for example, that image data items belonging to the first group were generated by digital camera 203 and a moving image data item was generated by video camera 204. In this case, even when the moving image data item was generated on the same date as the image data items, for example, second classifier 152 does not classify the moving image data item into the first group.

The expression "a video data item does not include location information" means that a video data item does not include location information recognizable by slide show generation device 100. Even when a moving image data item includes location information, if the location information is compliant with a standard that slide show generation device 100 cannot recognize, it is determined that the moving image data item does not include location information.

For example, first classifier 151 classifies, into a second group, a third video data item (an image data item in the present embodiment) among the plurality of video data items obtained by obtainer 120. The third video data item has a generation date and a generation location at least one of which is different from the generation date and the generation location of the plurality of first video data items belonging to the first group. In other words, first classifier 151 classifies, into a different group, an image data item with a generation date and a generation location at least one of which is different.

In this case, when the generation date and time of the second video data item is, in chronological order, between the generation date and time of any one of the plurality of first video data items belonging to the first group and the generation date and time of any one of a plurality of third video data items belonging to the second group, second classifier 152 classifies the second video data item into a group to which a video data item belongs, where the video data item is a video data item with a generation date and time closest to the generation date and time of the second video data item among a plurality of video data items each of which is classified into either the first group or the second group.

Alternatively, when the generation date and time of the second video data item is, in chronological order, between the generation date and time of any one of the plurality of first video data items belonging to the first group and the generation date and time of any one of the plurality of third video data items belonging to the second group, second classifier 152 classifies the second video data item into a group to which a video data item belongs, where the video data item is a video data item with an event type that matches the event type of the second video data item at the highest concordance rate among a plurality of video data items each of which is classified into either the first group or the second group.

It is assumed, for example, that the event type of a video data item belonging to the first group is "field day" and the event type of a video data item belonging to the second group is "outing". It is also assumed that the probability that the event type of the second video data is "field day" is 80% and the probability that the event type of the second video data is "outing" is 20%. In this case, second classifier 152 classifies the second video data into the first group.

Third classifier 153 is a processing unit that determines, for each group, whether the number of video data items reaches a predetermined number. Slide show generation device 100 generates, for each group, slide show data for causing display device 300 to sequentially display video data items. A time during which a slide show is displayed on display device 300 requires a certain length. It is therefore better if a certain number of video data items belong to each group. In view of this, third classifier 153 determines, for each group, whether the number of video data items reaches a predetermined number, and adds, to a group including video data items less than the predetermined number, a video data item that is most likely to be related to a video data item belonging to the group.

For example, third classifier 153 determines whether the number of a plurality of video data items belonging to the first group is less than a predetermined number. When determining that the number of the plurality of video data items belonging to the first group is less than the predetermined number, third classifier 153 determines whether the generation location of the plurality of first video data items belonging to the first group is at least a predetermined distance (a predetermined second distance) away from a predetermined location (a predetermined second location).

The predetermined number may be discretionarily determined in advance and is not specifically limited.

The predetermined second location may be discretionarily determined in advance and is not specifically limited. The predetermined second location is, for example, a user's home.

The predetermined second distance may be discretionarily determined in advance and is not specifically limited. The predetermined second distance is determined in advance as, for example, 10 km, 30 km, or 100 km, but any distance may be set for the predetermined second distance.

When determining that the generation location of the plurality of first video data items belonging to the first group is the predetermined second distance away from the predetermined second location, third classifier 153 extracts, from the plurality of video data items obtained by obtainer 120, a video data item generated the next day or thereafter of the generation date of the plurality of first video data items belonging to the first group. Third classifier 153 also determines whether the generation location of the extracted video data item is same as the generation location of the plurality of first video data items belonging to the first group.

That the generation locations of video data items are same does not only mean that, for example, coordinates data indicated by GPS data that is one example of location information perfectly match between the video data items, but also includes, for instance, a case where the name of an area such as "Japan" or "Osaka" is same or a case where the name of a town is same, or a case where the generation locations of two video data items are within a predetermined distance (a predetermined third distance) that is discretionarily determined in advance.

When determining that the generation location of the extracted video data item is same as the generation location of the plurality of first video data items belonging to the first group, third classifier 153 classifies the extracted video data item into the first group.

Generator 160 is a processing unit that generates slide show data based on video data items obtained by obtainer 120. Specifically, generator 160 generates, for each of groups into which classifier 150 has classified the video data items, slide show data indicating the playback order of video data items belonging to the group. For example, generator 160 selects one or more video data items from among a plurality of video data items which belong to the first group and each of which is a first video data item or a second video data item, and generates slide show data for sequentially playing back the selected one or more video data items.

The slide show data may be data indicating the playback order of a plurality of video data items or moving image data generated by joining a plurality of video data items.

For example, generator 160 sequentially arranges, in chronological order, a plurality of video data items in the first group, starting from a video data item with the earliest generation date and time.

For example, generator 160 divides, into N periods, a total period from the generation date and time of the leading first video data item until the generation date and time of the last video data item in the plurality of video data items arranged, where N is an integer of 2 or greater. Generator 160 then generates a plurality of small sets into which the arranged video data items are classified for each of the N periods in the total period.

Alternatively, generator 160 generates a plurality of small sets into which the arranged video data items are classified for every M video data items in order of the arrangement, where M is an integer of 2 or greater.

Generator 160 selects, for example, one or more video data items for each of the generated small sets.

When a plurality of video data items belonging to the first group include an image data item and a moving image data item, generator 160 may select the moving image data item with priority over the image data item.

Generator 160 may select, with priority, a video data item with an event type to which the largest number of video data items belong among the event types of a plurality of video data items belonging to the first group.

When selecting a predetermined number of video data items from among a plurality of video data items belonging to the first group, generator 160 may sequentially select a half of the predetermined number of video data items, in descending order starting from a video data item with an event type to which the largest number of video data items belong among the event types of the plurality of video data items belonging to the first group.

For example, generator 160 may select the remaining half of the predetermined number of video data items as video data items whose event types have not been selected as event types of the half of the predetermined number of video data items among the event types of the plurality of video data items belonging to the first group.

Alternatively, generator 160 may sequentially select the remaining half of the predetermined number of video data items, in ascending order starting from a video data item with an event type to which the smallest number of video data items belong among the event types of the plurality of video data items belonging to the first group.

Decoder 171 is a processing unit that decodes (e.g., decompresses) content that has been encoded (e.g., compressed) so that content such as video data can be displayed on display device 300 when the content is output from output unit 170.

The processing units such as obtainer 120, controller 130, estimator 140, classifier 150, generator 160, and decoder 171 are implemented by, for example, a control program stored in storage 190 and processor 130a that executes the control program.

Various processing units may be implemented by mutually different processors or a same processor.

Output unit 170 is a communication interface that outputs a plurality of video data items based on slide show data generated by generator 160. Output unit 170 is implemented by, for example, content output IF 170a. Output unit 170 may perform wired or wireless communication with display device 300. Communicator 110 and output unit 170 may be implemented by one hardware (more specifically, a communication interface).

Output unit 170 may output slide show data and a plurality of video data items to display device 300. In this case, display device 300 sequentially displays videos indicated by the plurality of video data items based on the slide show data, for example. Alternatively, output unit 170 may sequentially output the video data items based on the slide show data. In this case, display device 300 sequentially displays videos indicated by the output video data items.

Receiver 180 is a device that obtains an instruction from the user. Receiver 180 receives, for example, an optical signal transmitted from a keyboard operated by the user. Receiver 180 is implemented by, for example, light-receiving sensor 180a.

Storage 190 is a storage device that stores a plurality of video data items. Storage 190 is implemented by, for example, recording medium 190a.

1-2. Operation

Figure 4:
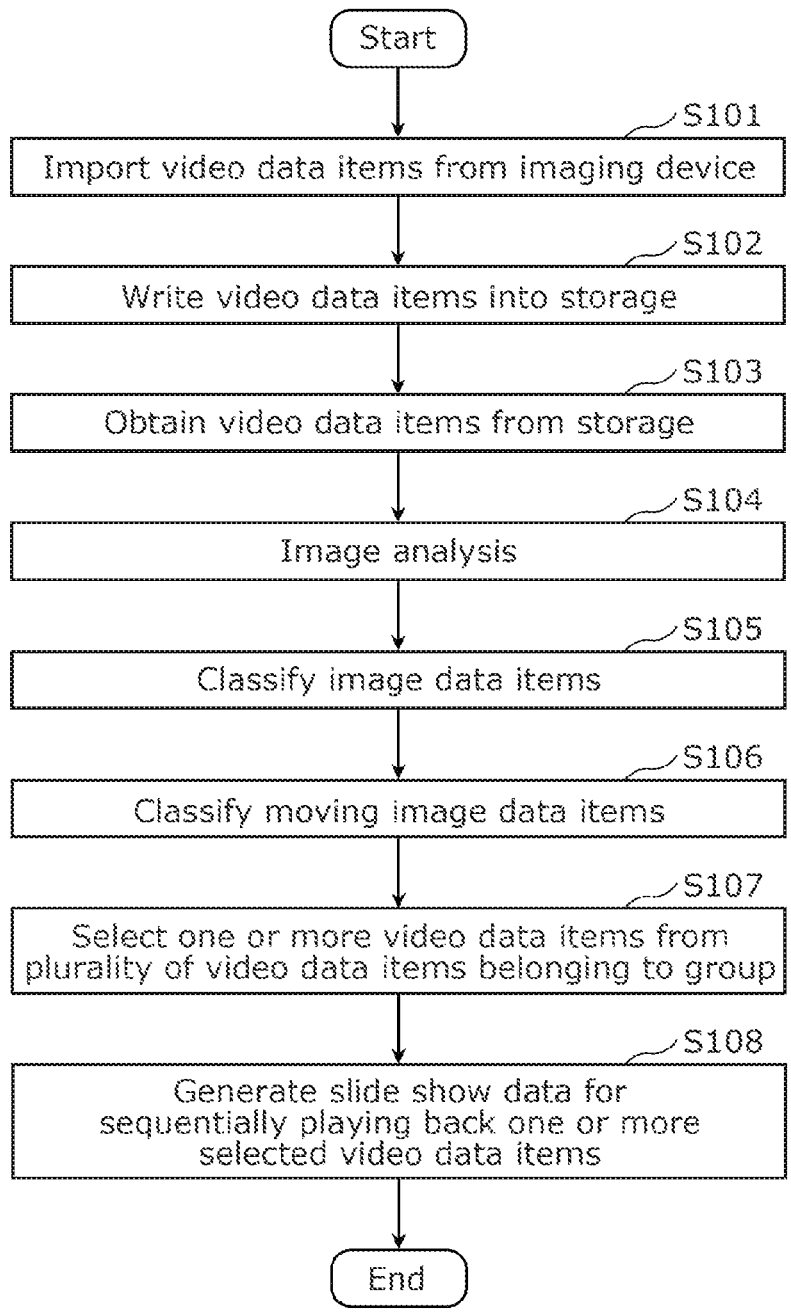
FIG. 4 is a flowchart showing the processing steps of slide show data generation performed by a slide show generation device according to the embodiment.

The following describes an operation of slide show generation device 100 configured as described above.
<Processing Steps>
FIG. 4 is a flowchart showing the processing steps of slide show data generation performed by slide show generation device 100 according to the embodiment.

First, slide show generation device 100 imports video data items from imaging device 200 (step S101). For example, controller 130 receives the video data items via communicator 110.

Slide show generation device 100 then writes the imported video data items into storage 190, i.e., causes storage 190 to store the video data items (step S102). For example, controller 130 causes storage 190 to store, via obtainer 120, the video data items received via communicator 110. Controller 130, for example, creates a folder for each date to cause storage 190 to store the folder. When receiving the video data items via communicator 110, controller 130 classifies each of the video data items into a corresponding one of folders based on the date on which the video data item was generated.

Slide show generation device 100 causes storage 190 to store a plurality of video data items by, for example, repeating the processes in steps S101 and S102.

Subsequently, obtainer 120 obtains the plurality of video data items stored in storage 190 (step S103).

Subsequently, estimator 140 performs image analysis on each of the plurality of video data items obtained by obtainer 120, to estimate the event type of each of the plurality of video data items (step S104).

Subsequently, classifier 150 classifies an image data item into any one of a plurality of groups based on a predetermined condition (step S105). The details of the image data classification will be described later.

Classifier 150 then classifies a moving image data item into any one of a plurality of groups based on a predetermined condition (step S106). For example, classifier 150 classifies the moving image data items into any one of the plurality of groups to which the image data items classified into the plurality of groups in step S105 belong. The details of the moving image data classification will be described later.

Subsequently, generator 160 selects, for each of the groups classified by classifier 150, one or more video data items from a plurality of video data items belonging to the group (step S107).

Generator 160 then generates, for each of the groups classified by classifier 150, slide show data for sequentially playing back the one or more selected video data items (step S108). Slide show generation device 100 thus generates slide show data for each group.

Generator 160 causes storage 190 to store the generated slide show data.

Figure 5:
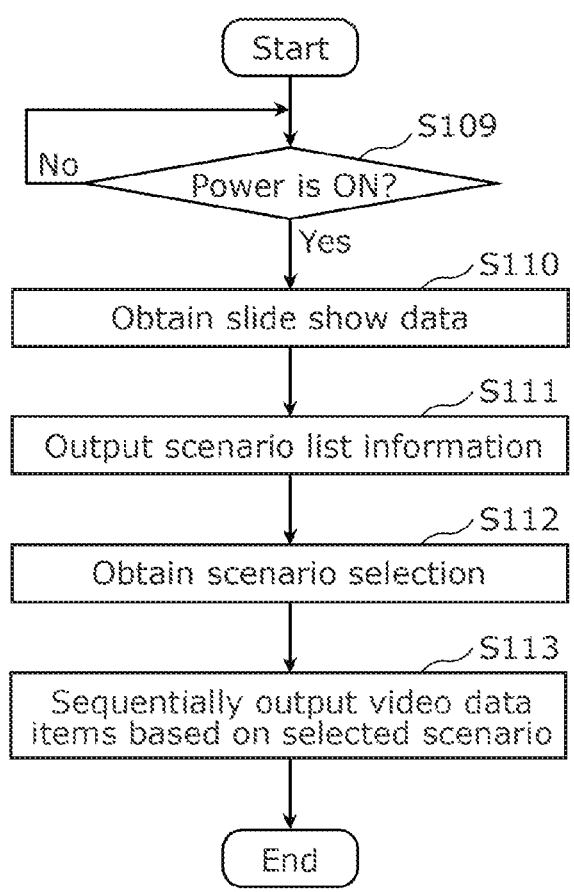
FIG. 5 is a flowchart showing the processing steps of slide show playback performed by a slide show generation device according to the embodiment.

FIG. 5 is a flowchart showing the processing steps of the slide show playback performed by slide show generation device 100 according to the embodiment.

It is assumed, for example, that slide show generation device 100 executes the processes in steps S101 through S108 to generate both slide show data and scenario list information, and power is turned OFF by the user.

Slide show generation device 100 determines whether power is turned ON (step S109). For example, controller 130 determines whether a signal indicating an instruction to turn power ON is received from the user via receiver 180 or whether a power button not illustrated in the drawings is pressed.

When it is determined that the power of slide show generation device 100 is not turned ON (No in step S109), controller 130 returns to step S109.

When it is determined that the power of slide show generation device 100 is turned ON (Yes in step S109), controller 130 causes obtainer 120 to obtain slide show data from storage 190 (step S110). In this case, controller 130 generates scenario list information which is a list of slide show data for each group. The scenario list information is, for example, data indicating a chart in which the title of each slide show data is presented. The title may be discretionarily determined. The title may be, for instance, the generation date, location, or event type of video data items belonging to a group.

Subsequently, controller 130 causes output unit 170 to output the scenario list information to display device 300 to cause display device 300 to display the scenario list information (step S111).

Controller 130 then obtains scenario selection from the user (step S112). For example, the user operates a keyboard to select one scenario from among a plurality of scenarios (e.g., slide show data titles) displayed by display device 300 as scenario list information, and causes the keyboard to transmit a signal indicating the selected scenario. For example, controller 130 receives, via receiver 180, the signal indicating the scenario selected by the user. Controller 130 thus obtains scenario selection.

Controller 130 subsequently causes output unit 170 to sequentially output video data items based on the selected scenario, i.e., slide show data of the selected scenario, to cause display device 300 to sequentially display images or moving images indicated by the video data items (step S113). Needless to say, controller 130 may cause output unit 170 to output together, to display device 300, a plurality of video data items and slide show data indicating an order in which the plurality of video data items are to be displayed.

Figure 6:
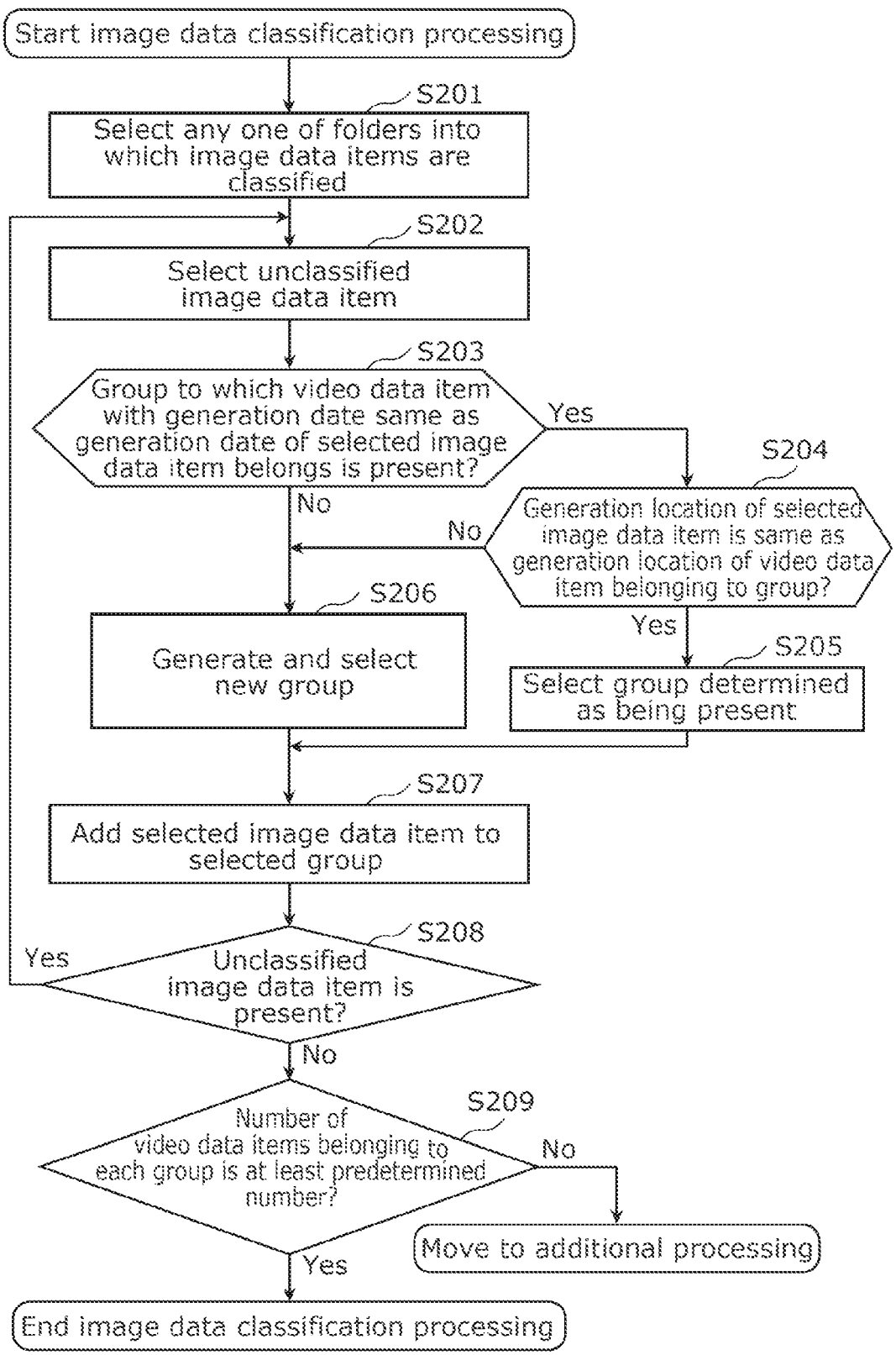
FIG. 6 is a flowchart showing the processing steps of image data classification performed by a slide show generation device according to the embodiment.

FIG. 6 is a flowchart showing the processing steps of the image data classification performed by slide show generation device 100 according to the embodiment. Specifically, FIG. 6 is a flowchart showing the details of the process in step S105.

First classifier 151 selects any one of the folders into which the image data items are classified and which are stored in storage 190 (step S201). For example, controller 130 classifies video data items into folders created for each date, based on the dates when the video data items were generated, as described above. In other words, each of the folders includes video data items with the same generation date. For example, first classifier 151 selects, from among the folders, a folder storing an image data item generated the earliest among folders storing unclassified image data items that have not been classified into any of the groups.

First classifier 151 then selects an image data item that has not been classified into any of the groups among image data items stored in the selected folder, that is, an image data item that does not belong to any of the groups (step S202). When there is a plurality of such image data items, first classifier 151 needs to select any one of the plurality of the image data items.

Subsequently, first classifier 151 determines whether a group to which a video data item with a generation date same as the generation date of the selected image data item belongs is present (step S203).

When determining that a group to which a video data item with a generation date same as the generation date of the selected image data item belongs is present (Yes in step S203), first classifier 151 determines whether the generation location of the selected image data item is same as the generation location of the video data item belonging to the group determined as being present (step S204).

When determining that the generation location of the selected image data item is same as the generation location of the video data item belonging to the group determined as being present (Yes in step S204), first classifier 151 selects the group determined as being present (step S205).

When determining No in step S203, or determining No in step S204, first classifier 151 generates and selects a new group (step S206).

First classifier 151 adds the selected image data item to the selected group after step S205 or step S206 (step S207). Stated differently, first classifier 151 associates the selected image data item with the selected group so that the selected image data item belongs to the selected group.

Subsequently, first classifier 151 determines whether an unclassified image data item is present in the selected folder (step S208).

When determining that an unclassified image data item is present in the selected folder (Yes in step S208), first classifier 151 returns to step S202.

When determining that no unclassified image data item is present in the selected folder (No in step S208), first classifier 151 determines whether the number of video data items belonging to each group is at least a predetermined number (step S209).

When determining that the number of video data items belonging to each group is at least the predetermined number (Yes in step S209), first classifier 151 ends the image data classification processing.

When determining that the number of video data items belonging to each group is not at least the predetermined number (No in step S209), that is, determining that a group including video data items less than the predetermined number is present, first classifier 151 moves to additional processing.

Figure 7:
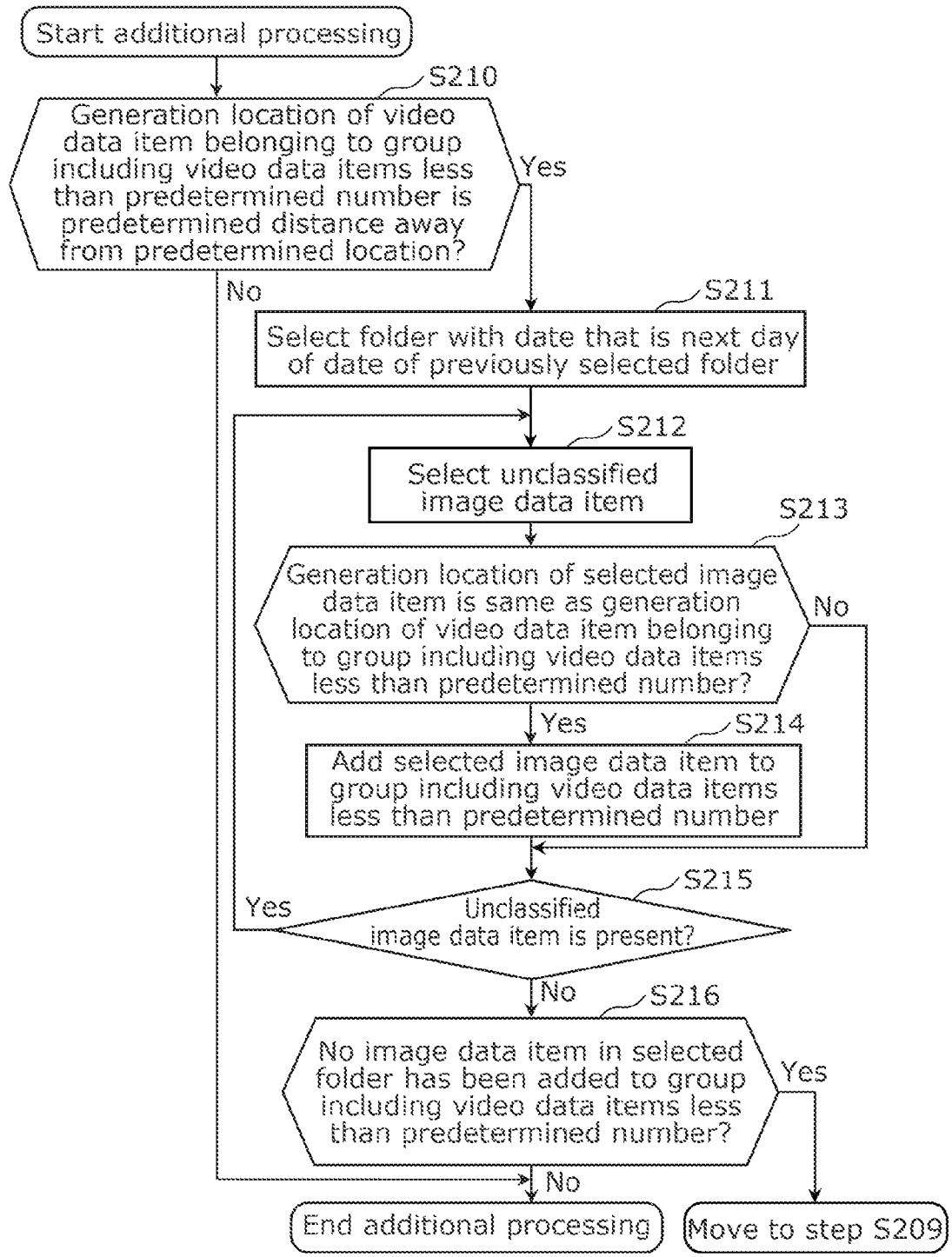
FIG. 7 is a flowchart showing the processing steps of additional processing of the image data classification performed by a slide show generation device according to the embodiment.

FIG. 7 is a flowchart showing the processing steps of additional processing (i.e., processing that follows in the case of No in step S209) of the image data classification performed by slide show generation device 100 according to the embodiment.

Third classifier 153 determines whether the generation location of a video data item (more specifically, an image data item) belonging to a group including video data items less than the predetermined number is at least a predetermined distance away from a predetermined location (step S210). It is assumed, for example, that the predetermined location is home and the predetermined distance is 30 km. In this case, third classifier 153 determines whether the generation location of the image data item is away from home by at least 30 km.

When determining that the generation location of the video data item is not at least the predetermined distance away from the predetermined location (No in step S210), third classifier 153 ends the additional processing (more specifically, the image data classification processing).

When determining that the generation location of the video data item is at least the predetermined distance away from the predetermined location (Yes in step S210), third classifier 153 selects a folder with a date that is the next day of the date of the folder selected in step S201 (step S211). In other words, in the case of Yes in step S210, third classifier 153 selects a folder storing image data items generated the next day of the generation date of image data items stored in the folder selected in step S201.

Third classifier 153 then selects an image data item that has not been classified into any of the groups among the image data items stored in the selected folder (step S212).

Subsequently, third classifier 153 determines whether the generation location of the selected image data item is same as the generation location of the video data item belonging to the group including video data items less than the predetermined number (step S213).

When determining that the generation location of the selected image data item is same as the generation location of the video data item belonging to the group including video data items less than the predetermined number (Yes in step S213), third classifier 153 adds the selected image data item to that group (step S214).

After step S214 or in the case of No in step S213, third classifier 153 determines whether an image data item that has not been classified into any of the groups (i.e., unclassified) is present in the selected folder (step S215).

When determining that such an image data item is present in the selected folder (Yes in step S215), third classifier 153 returns to step S212.

When determining that no such image data item is present in the selected folder (No in step S215), third classifier 153 determines whether no image data item in the selected folder has been added to the group including video data items less than the predetermined number (step S216).

When determining that no image data item in the selected folder has been added to the group including video data items less than the predetermined number (No in step S216), third classifier 153 ends the additional processing (more specifically, the image data classification processing).

When determining that even one image data item in the selected folder has been added to the group including video data items less than the predetermined number (Yes in step S216), third classifier 153 returns to step S209.

When No in step S209 and then Yes in step S210 in the case of Yes in step S216, for example, third classifier 153 selects a folder with the next date in step S211. In this way, when a group including video data items less than the predetermined number is present, third classifier 153 adds, to the group, an image data item generated the next day or thereafter of the generation date of the video data items belonging to that group, in accordance with the generation location of the image data item.

Figure 8:
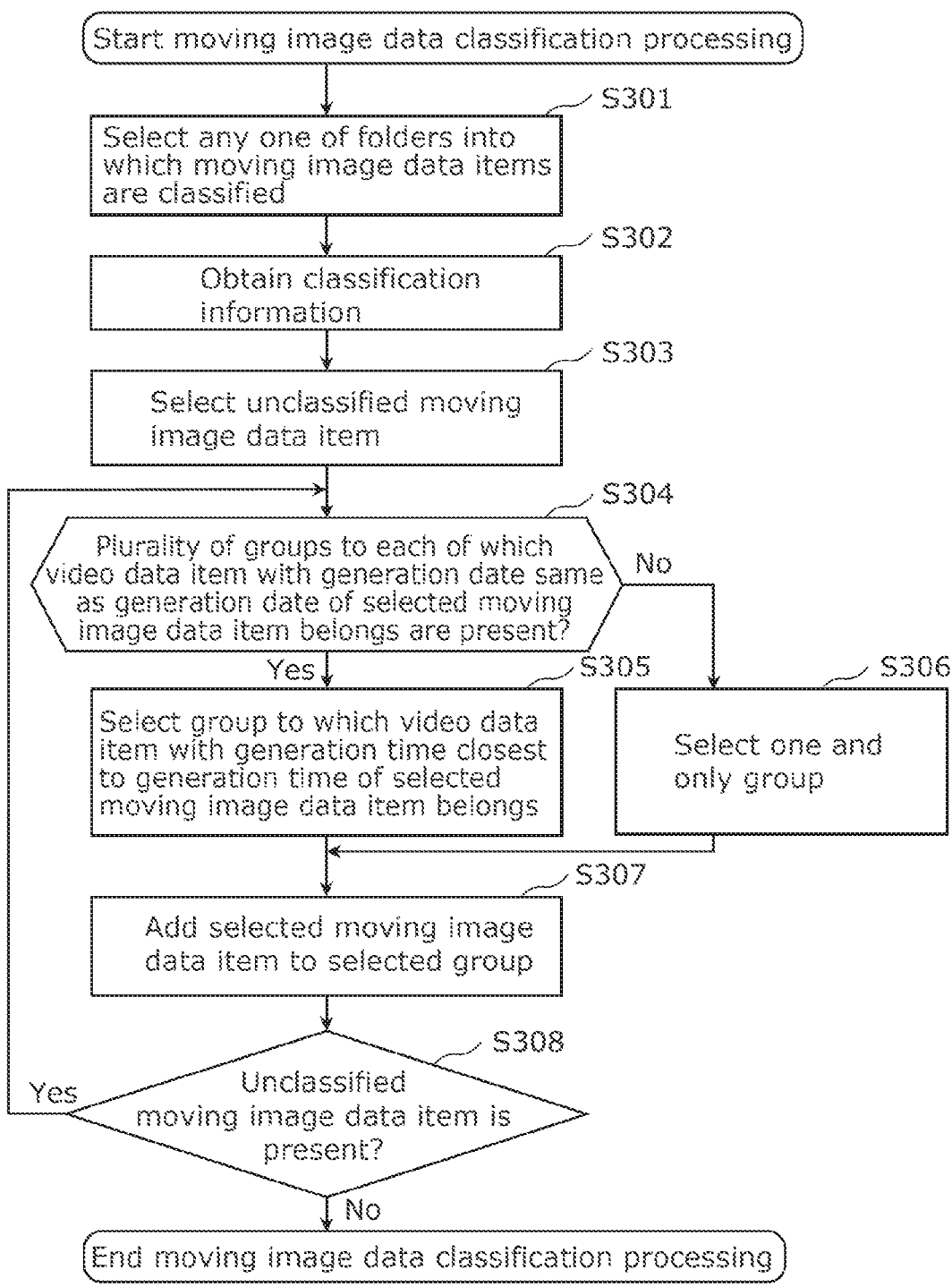
FIG. 8 is a flowchart showing the processing steps of moving image data classification performed by a slide show generation device according to the embodiment.

FIG. 8 is a flowchart showing the processing steps of the moving image data classification performed by slide show generation device 100 according to the embodiment. Specifically, FIG. 8 is a flowchart showing the details of the process in step S106.

Second classifier 152 selects any one of folders into which the moving image data items are classified and which are stored in storage 190 (step S301). For example, second classifier 152 selects, from among the folders, a folder storing a moving image data item generated the earliest among folders storing unclassified moving image data items that have not been classified into any of the groups.

Second classifier 152 then obtains classification information (step S302).

Classification information is information on groups into which video data items are classified. With the processes in steps S201 through S216 being executed, an image data item is classified into any one of the groups, as described above. Through the subsequent processes, for example, second classifier 152 classifies a moving image data item into any one of the groups included in classification information, based on the classification information.

Subsequently, second classifier 152 selects a moving image data item that has not been classified into any one of the groups among moving image data items stored in the selected folder (step S303).

Second classifier 152 then determines whether a plurality of groups to each of which a video data item with a generation date same as a date when the selected moving image data item was generated (generation date) belongs are present (step S304). In other words, second classifier 152 determines whether a plurality of groups to each of which a video data item with a generation date same as the generation date of the selected moving image data item belongs are present, or only one such group is present.

When determining that a plurality of groups to each of which a video data item with a generation date same as the generation date of the selected moving image data item belongs are present (Yes in step S304), second classifier 152 selects a group to which a video data item with a generation time closest to the generation time of the selected moving image data item belongs among the plurality of the groups (step S305).

When determining that only one group to which a video data item with a generation date same as the generation date of the selected moving image data item belongs is present (No in step S304), second classifier 152 selects the one and only group (step S306).

When determining that no image data item with a generation date same as the generation date of the selected moving image data item is present in step S304, second classifier 152 may generate and select a new group.

After step S305 or step S306, second classifier 152 adds the selected moving image data item to the selected group (step S307).

Subsequently, second classifier 152 determines whether a moving image data item that has not been classified into any of the groups, i.e., an unclassified moving image data item is present in the selected folder (step S308).

When determining that such unclassified moving image data item is present in the selected folder (Yes in step S308), second classifier 152 returns to step S304.

When determining that no such unclassified moving image data item is present in the selected folder (No in step S308), second classifier 152 ends the moving image data classification processing.

Figure 9:
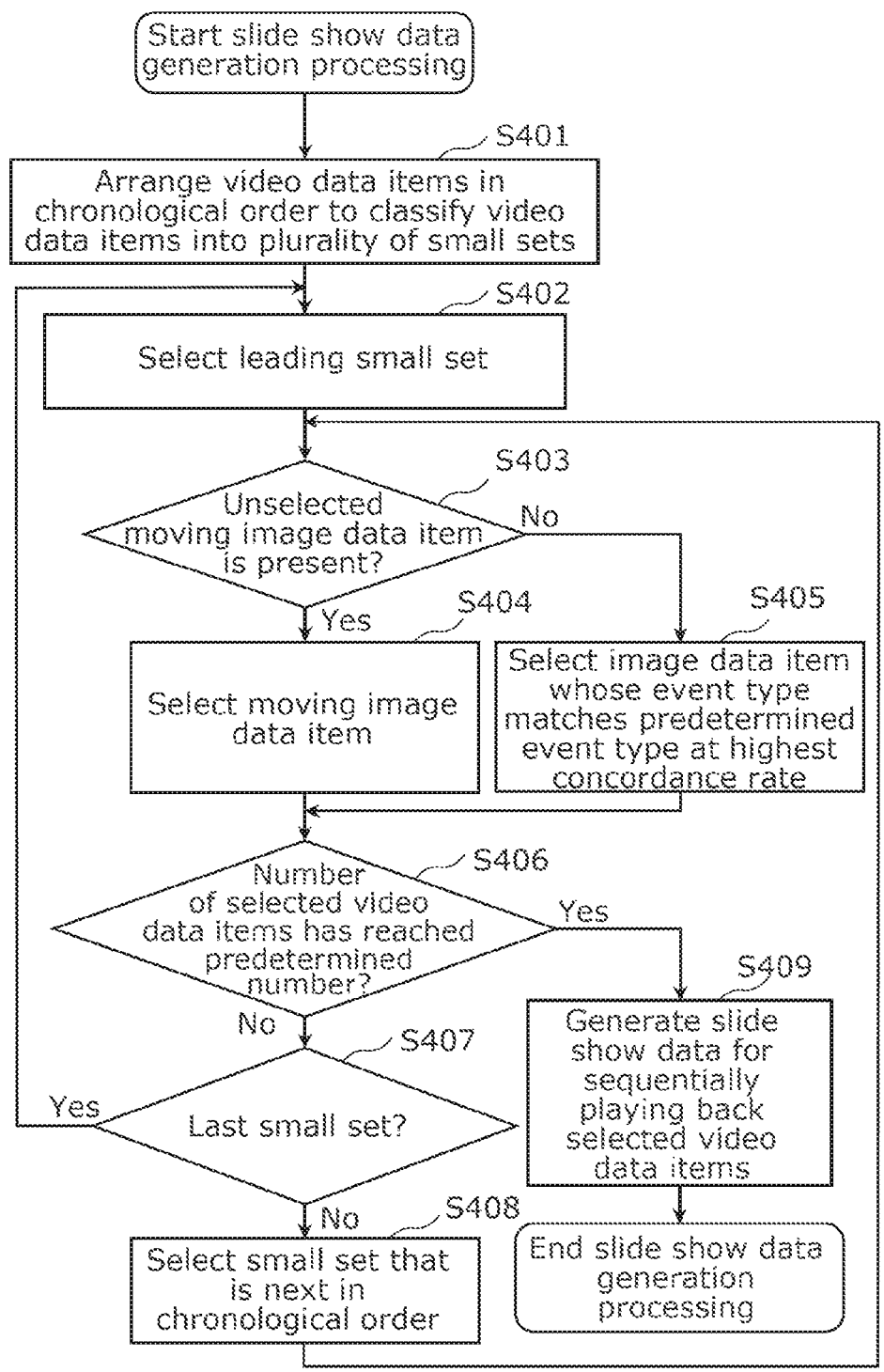
FIG. 9 is a flowchart showing the processing steps of slide show data generation performed by a slide show generation device according to the embodiment.

FIG. 9 is a flowchart showing the processing steps of slide show data generation performed by slide show generation device 100 according to the embodiment. Specifically, FIG. 9 is a flowchart illustrating the details of the processes in step S107 and step S108.

FIG. 9 illustrates the processing steps of the slide show data generation for any one of groups classified by classifier 150. By executing the subsequent processes for each of the groups, generator 160 generates slide show data for each group. The description of FIG. 9 is provided under the assumption that a plurality of video data items belong to a group for which generator 160 generates slide show data.

Generator 160 sequentially arranges, in chronological order, a plurality of video data items belonging to a group, starting from a video data item with the earliest generation date and time, that is, sequentially arranges the video data items in chronological order, to classify the arranged video data items into a plurality of small sets (step S401). For example, generator 160 divides, into N periods, a total period from the generation date and time of the leading video data item until the generation date and time of the last video data item in the arranged video data items, and generates a plurality of small sets into which the arranged video data items are classified for each of the N periods in the total period. Alternatively, generator 160 generates a plurality of small sets into which the arranged video data items are classified for every M video data items in order of the arrangement, for example.

Subsequently, generator 160 selects a small set that is leading among the plurality of small sets in chronological order (step S402).

Generator 160 then determines whether an unselected moving image data item is present among video data items belonging to the selected small set (step S403).

When determining that an unselected moving image data item is present among the video data items belonging to the selected small set (Yes in step S403), generator 160 selects the unselected moving image data item (step S404). When a plurality of unselected moving image data items are present, generator 160 selects any one of the plurality of unselected moving image data items. In that case, generator 160 may randomly select an unselected moving image data item. If a group being selected is a group classified based on an event type, generator 160 may preferentially select a moving image data item that is highly related to the event type of the selected group based on the result of image analysis.

When determining that an unselected moving image data item is not present among the video data items belonging to the selected small set (No in step S403), generator 160 selects another image data item with an event type that matches a predetermined event type at the highest concordance rate among image data items belonging to the selected small set (step S405).

The predetermined event type may be discretionarily set, and is not specifically limited. The predetermined event type may be set by the user in advance, or generator 160 may determine, as the predetermined event type, an event type to which the largest number of video data items belong among the event types of video data items belonging to groups, for example.

After step S404 or step S405, generator 160 determines whether the number of selected video data items has reached a predetermined number (step S406).

When determining that the number of selected video data items has not reached the predetermined number (No in step S406), generator 160 determines whether the selected small set is the last small set in chronological order (step S407).

When determining that the selected small set is the last small set in chronological order (Yes in step S407), generator 160 returns to step S402.

When determining that the selected small set is not the last small set in chronological order (No in step S407), generator 160 selects a small set that is next to the previously selected small set in chronological order (step S408), and returns to step S403.

Generator 160 repeats the processes in steps S402 through S408 until the number of selected video data items reaches the predetermined number, to select an equal number of video data items from each of the plurality of small sets.

When determining that the number of selected video data items has reached the predetermined number (Yes in step S406), generator 160 generates slide show data for sequentially playing back the selected video data items (step S409) and ends the slide show data generation processing.

When the number of video data items belonging to a group is less than the predetermined number, generator 160 may select all of the video data items belonging to the group and execute the process in step S409, or may not generate slide show data for the group.

Specific Examples

Hereinafter, each processing executed by slide show generation device 100 will be described in detail with reference to FIG. 10 through FIG. 17. In the following description, an image data item may be simply referred to as a photo while a moving image data item may be simply referred to as a video.

Figure 10:
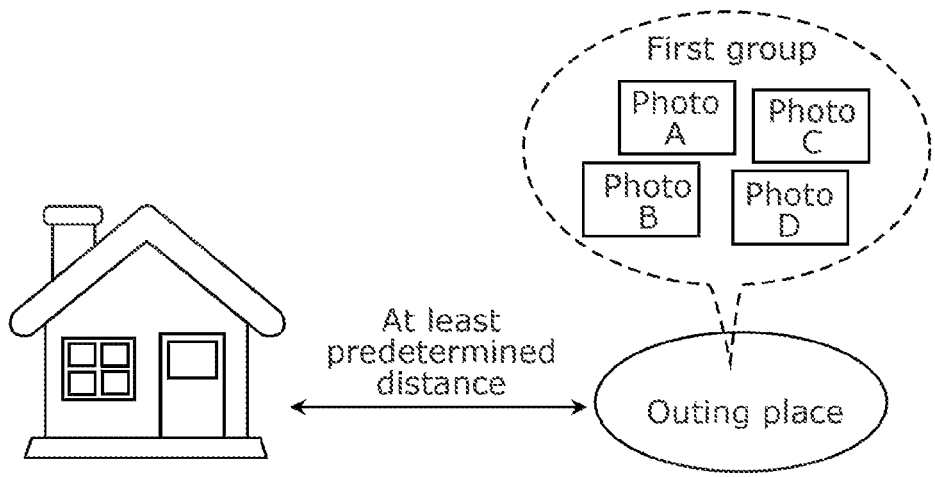
FIG. 10 is a diagram illustrating the first example of the image data classification performed by a slide show generation device according to the embodiment.

FIG. 10 is a diagram illustrating the first example of the image data classification performed by slide show generation device 100 according to the embodiment.

First classifier 151 classifies, for example, photo A, photo B, photo C, and photo D generated at a location away from home by at least a predetermined distance and generated at an outing place into the same group (e.g., the first group).

The generation dates of photos A through D may be same or different. It is assumed, for example, that first classifier 151 performs the processes in steps S201 through S208 to classify photos A through C into the first group, and determines No in step S209. In this case, first classifier 151 and third classifier 153 may repeatedly perform the processes in steps S209 through S216 to classify, into the first group, photo D generated the next day or thereafter of the generation date of photos A through C.

Figure 11:
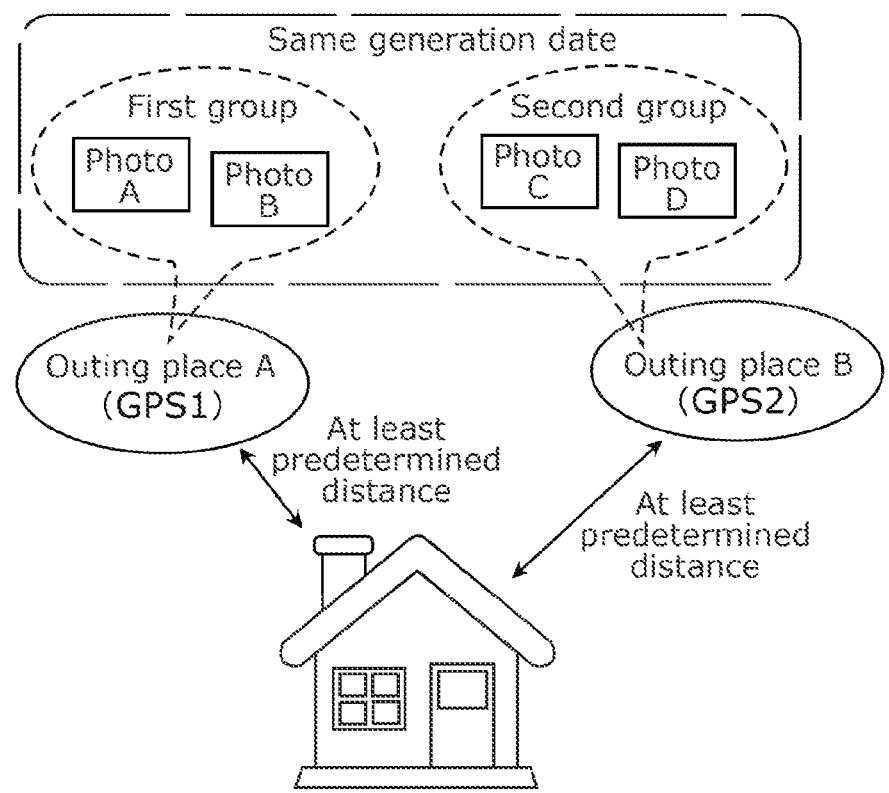
FIG. 11 is a diagram illustrating the second example of the image data classification performed by a slide show generation device according to the embodiment.

FIG. 11 is a diagram illustrating the second example of the image data classification performed by slide show generation device 100 according to the embodiment.

First classifier 151 classifies, for examples, photos A through D generated on the same date into different groups based on the generation locations of photos A through D. It is assumed, for example, that GPS data of outing place A indicates GPS1 and GPS data of outing place B indicates GPS2. It is also assumed that photo A and photo B each include location information indicating GPS1, and photo C and photo D each include location information indicating GPS2. In this case, first classifier 151 classifies photo A and photo B into a group different from the group of photo C and photo D. For example, first classifier 151 classifies photo A and photo B into the same group (e.g., the first group) and classifies photo C and photo D into the same group (e.g., the second group).

Figure 12:
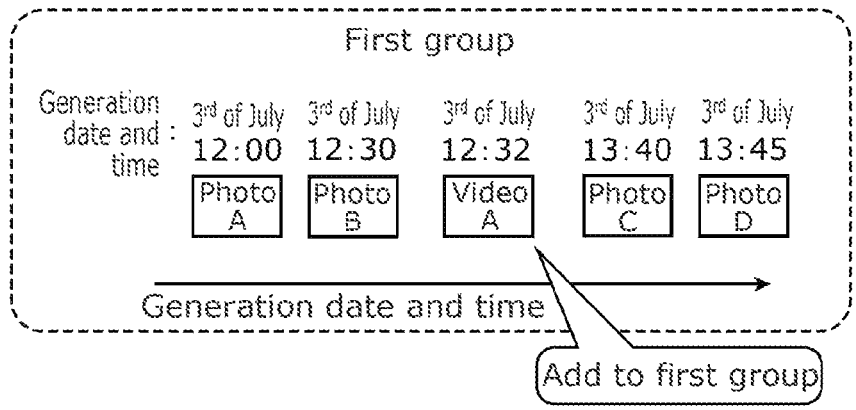
FIG. 12 is a diagram illustrating the first example of the moving image data classification performed by a slide show generation device according to the embodiment.

FIG. 12 is a diagram illustrating the first example of the moving image data classification performed by slide show generation device 100 according to the embodiment. The generation date and time of each of photos A through D and video A is indicated above a corresponding one of photos A through D and video A illustrated in FIG. 12. For example, photo A was generated at 12:00 on the $3^{rd}$ of July.

It is assumed, for example, that photos A through D are classified into the first group by first classifier 151. As illustrated in FIG. 12, each of the generation dates of photos A through D belonging to the first group is the $3^{rd}$ of July and the generation date of video A is the $3^{rd}$ of July, for example. In this case, when selecting video A in step S303 and determining No in step S304, second classifier 152 selects the first group in step S306 and adds video A to the first group in step S307.

Figure 13:
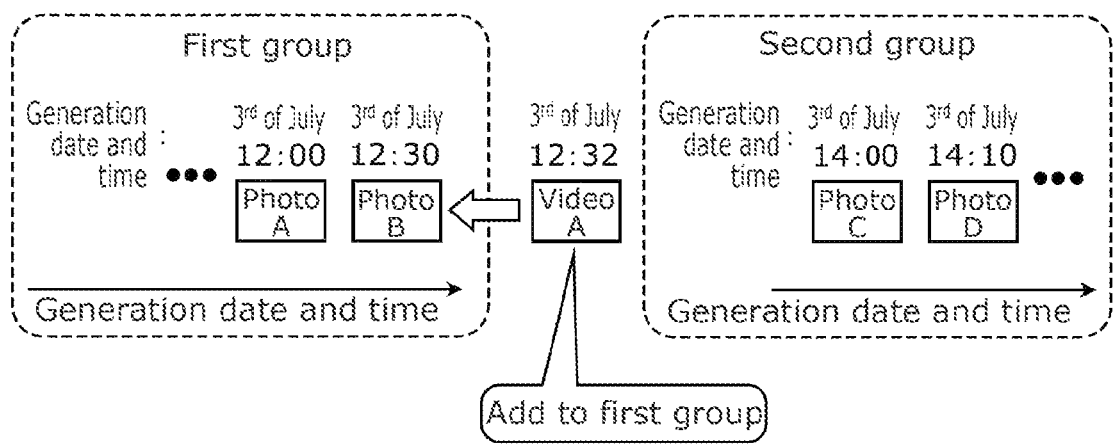
FIG. 13 is a diagram illustrating the second example of the moving image data classification performed by a slide show generation device according to the embodiment.

FIG. 13 is a diagram illustrating the second example of the moving image data classification performed by slide show generation device 100 according to the embodiment. The generation date and time of each of photos A through D is indicated above a corresponding one of photos A through D illustrated in FIG. 13.

It is assumed, for example, that photo A and photo B are classified into the first group and photo C and photo D are classified into the second group by first classifier 151. As illustrated in FIG. 13, each of the generation dates of photos A through D is the $3^{rd}$ of July and the generation date of video A is the $3^{rd}$ of July. In this case, second classifier 152 determines Yes in step S304. Photo B belonging to the first group was generated the latest among video data items belonging to the first group and the generation time of photo B is 12:30. Photo C belonging to the second group was generated the earliest among video data items belonging to the second group and the generation time of photo C is 14:00. The generation time of video A is 12:32. In other words, the generation time of video A is closer to the generation time of photo B than to the generation time of photo C. Accordingly, in this case, second classifier 152 selects the first group in step S305 and adds video A to the first group in step S307.

Figure 14:
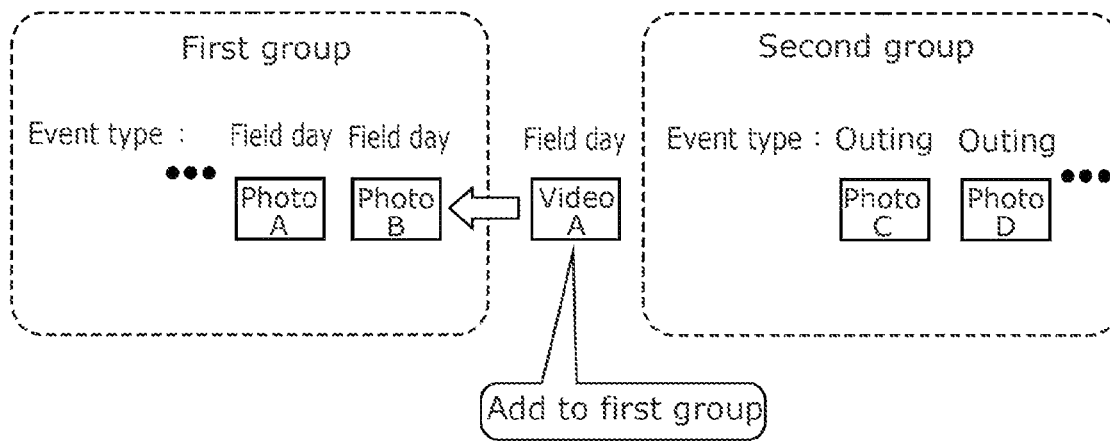
FIG. 14 is a diagram illustrating the third example of the moving image data classification performed by a slide show generation device according to the embodiment.

FIG. 14 is a diagram illustrating the third example of the moving image data classification performed by slide show generation device 100 according to the embodiment. The event types of photos A through D are indicated above photos A through D illustrated in FIG. 14. For example, the event type of photo A is a field day.

It is assumed, for example, that photo A and photo B are classified into the first group and photo C and photo D are classified into the second group by first classifier 151. It is also assumed, for example, that the event type of all of video data items belonging to the first group is a field day and the event type of all of video data items belonging to the second group is an outing. Moreover, the event type of video A is assumed to be a field day. In this case, second classifier 152 may classify video A into the first group. Second classifier 152 may thus determine a group to which a video data item belongs based on the event type of the video data item.

Figure 15:
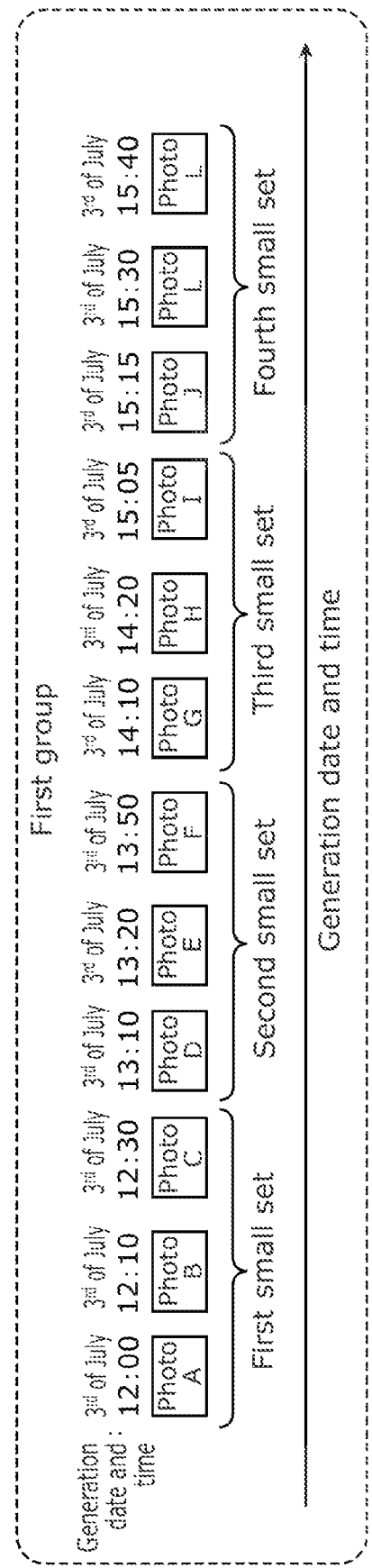
FIG. 15 is a diagram illustrating the fourth example of the moving image data classification performed by a slide show generation device according to the embodiment.

FIG. 15 is a diagram illustrating the fourth example of the moving image data classification performed by slide show generation device 100 according to the embodiment. The generation date and time of each of photos A through L is indicated above a corresponding one of photos A through L illustrated in FIG. 15.

In step S401, generator 160 arranges photos A through L in chronological order and generates a plurality of small sets into which the arranged photos A through L are classified for every M photos (M=3 in the present example), for example. Generator 160 classifies photos A through C into the first small set, photos D through F into the second small set, photos G through I into the third small set, and photos J through L into the fourth small set, for example.

Figure 16:
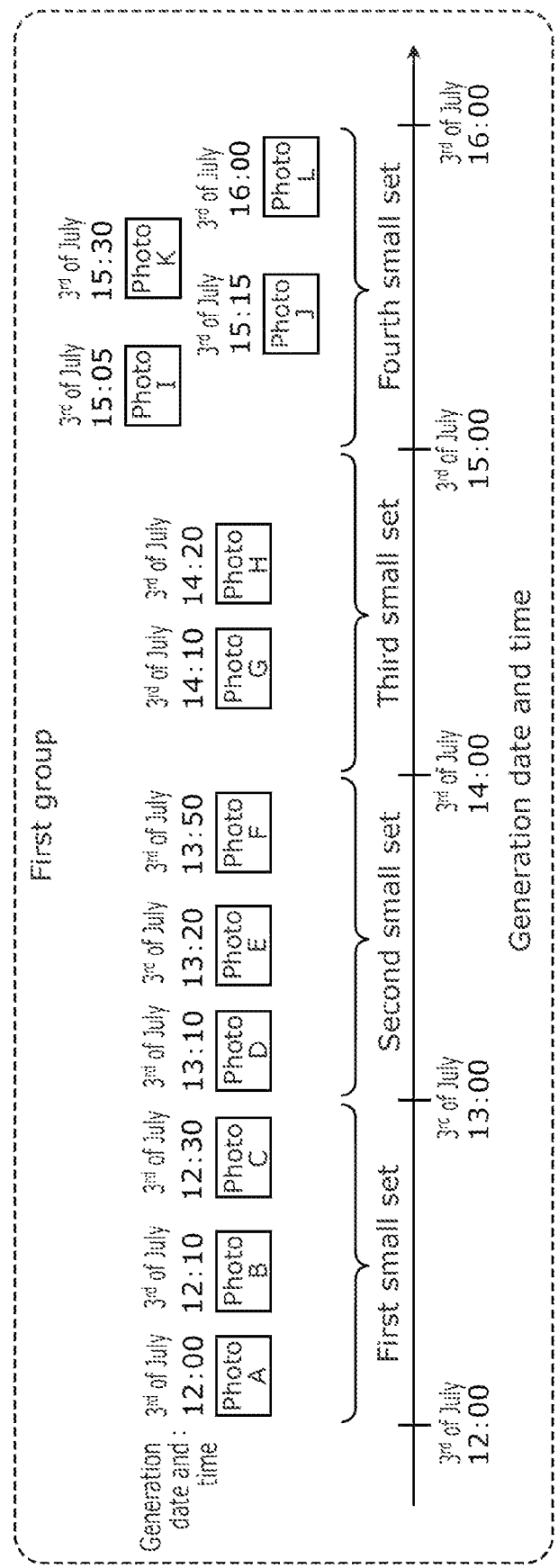
FIG. 16 is a diagram illustrating the fifth example of the moving image data classification performed by a slide show generation device according to the embodiment.

FIG. 16 is a diagram illustrating the fifth example of the moving image data classification performed by slide show generation device 100 according to the embodiment. The generation date and time of each of photos A through L is indicated above a corresponding one of photos A through L illustrated in FIG. 16.

In step S401, generator 160 may divide, into N periods (N=4 in the present example), a total period from the generation date and time of the leading video data item (photo A in the present example) to the generation date and time of the last video data item (photo L in the present example) among photos A through L arranged in chronological order, and generate a plurality of small sets into which the arranged video data items are classified for each of the N periods in the total period, which is different from the example described with reference to FIG. 15. It is assumed, for example, that photo A was generated at 12:00 and photo L was generated at 16:00. In this case, the total period is four hours from 12:00 to 16:00. Accordingly, when N=4, generator 160 classifies photos A through L into any one of the following: the first small set which is a small set to which video data items generated from 12:00 to 13:00 belong; the second small set which is a small set to which video data items generated from 13:00 to 14:00 belong; the third small set which is a small set to which video data items generated from 14:00 to 15:00 belong; and the fourth small set which is a small set to which video data items generated from 15:00 to 16:00 belong. In the present example, generator 160 classifies, for example, photos A through C into the first small set, photos D through F into the second small set, photos G through H into the third small set, and photos I through L into the fourth small set.

M and N described above may be discretionarily determined in advance.

Figure 17:
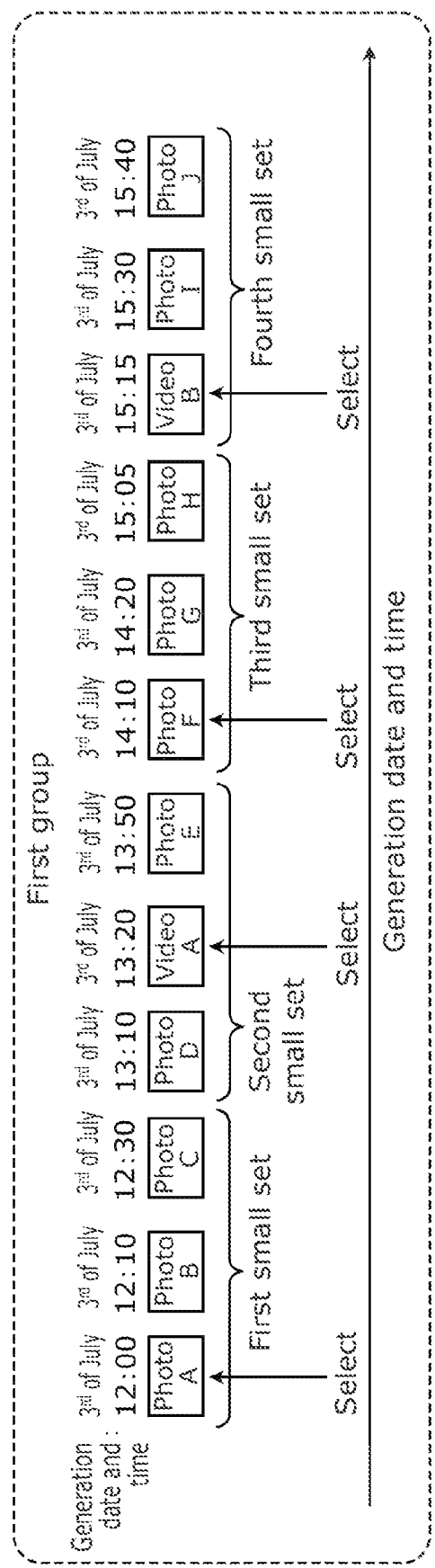
FIG. 17 is a diagram illustrating the sixth example of the moving image data classification performed by a slide show generation device according to the embodiment.

FIG. 17 is a diagram illustrating the sixth example of the moving image data classification performed by slide show generation device 100 according to the embodiment. The generation date and time of each of photos A through J and videos A and B is indicated above a corresponding one of photos A through J and videos A and B illustrated in FIG. 17.

It is assumed that generator 160 has arranged, in chronological order as illustrated in FIG. 17, photos A through J and videos A and B belonging to the first group, and classified photos A through J and videos A and B into a plurality of small sets. In this case, generator 160 selects one video data item from among a plurality of video data items belonging to the first small set, one video data item from among a plurality of video data items belonging to the second small set, one video data item from among a plurality of video data items belonging to the third small set, and one video data item from among a plurality of video data items belonging to the fourth small set, for example. When the number of the selected video data items does not reach a predetermined number, generator 160 further selects another video data item from the first small set. Generator 160 preferentially selects, for example, a moving image data item from among video data items belonging to a small set. When selecting one video data item from among the plurality of video data items belonging to the second small set, for example, generator 160 selects video A. If no moving image data item is present among video data items belonging to a small set, generator 160 may select any image data item from the video data items. When selecting one video data item from among the plurality of video data items belonging to the first small set, generator 160 may select photo A with the earliest generation date among the plurality of video data items belonging to the first small set. Alternatively, if no moving image data item is present among video data items belonging to a small set, generator 160 may select an image data item based on an event type from among the video data items, as described above.

<Summary>

Slide show generation device 100 as described above operates as follows, for example.

Figure 18:
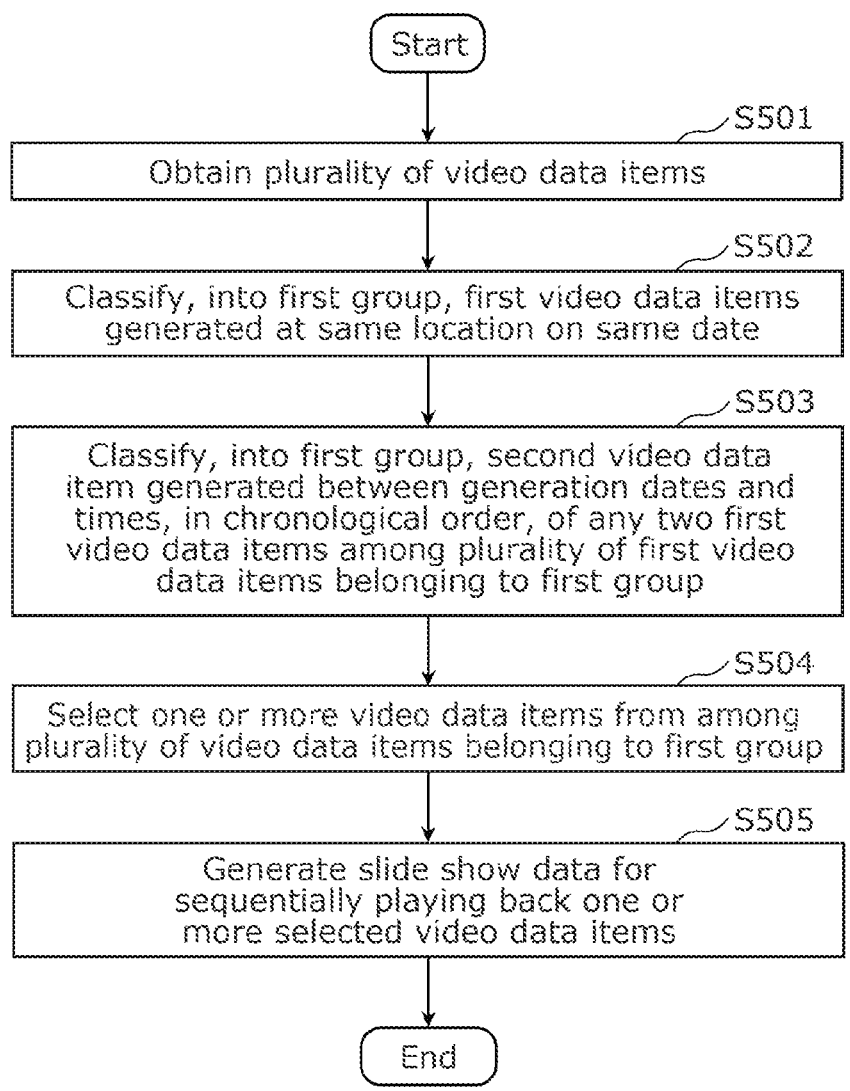
FIG. 18 is a flowchart showing processing steps employed by a slide show generation device according to the embodiment.

FIG. 18 is a flowchart showing processing steps employed by slide show generation device 100 according to the embodiment.

First, obtainer 120 obtains a plurality of video data items (step S501). For example, obtainer 120 obtains a plurality of video data items stored in storage 190 from storage 190, as in step S103.

Subsequently, first classifier 151 classifies first video data items, among the plurality of video data items obtained by obtainer 120, that were generated at the same location on the same date into the first group (step S502). When first classifier 151 knows the generation dates and times as well as generation locations of the plurality of video data items (i.e., when each of the plurality of video data items includes: time and date information indicating the generation time and date of the video data item; and location information indicating the generation location of the video data item), for example, first classifier 151 classifies the plurality of video data items into a plurality of groups, for each of the generation dates and times and the generation locations.

Subsequently, second classifier 152 classifies, into the first group, a second video data item among the plurality of video data items obtained by obtainer 120 which is a video data item that does not include location information indicating the generation location of the video data item and that was generated between the generation dates and times, in chronological order, of any two first video data items among the plurality of first video data items belonging to the first group (step S503). For example, second classifier 152 determines whether the second video data item was generated between the generation dates and times, in chronological order, of any two first video data items among the plurality of first video data items belonging to the first group, based on date and time information included in each of the first video data items belonging to the first group and date and time information included in the second video data item, as described with reference to FIG. 12. When determining that the second video data item was generated between the generation dates and times, in chronological order, of any two first video data items among the plurality of first video data items belonging to the first group, second classifier 152 classifies the second video data item into the first group.

Subsequently, generator 160 selects one or more video data items from among a plurality of video data items which belong to the first group and each of which is a first video data item or a second video data item (step S504).

Generator 160 then generates slide show data for sequentially playing back the one or more video data items selected in step S504 (step S505).

1-3. Advantageous Effects, Etc.

As described above, the slide show generation method according to the embodiment includes: obtaining a plurality of video data items (step S501); classifying first video data items, among the plurality of video data items obtained in the obtaining, which were generated at the same generation location on the same generation date into the first group (step S502); classifying, into the first group, a second video data item among the plurality of video data items obtained in the obtaining which is a video data that does not include location information indicating the generation location of the video data item and that was generated between the generation dates and times, in chronological order, of any two first video data items among the plurality of first video data items belonging to the first group (step S503); and selecting one or more video data items from among a plurality of video data items which belong to the first group and each of which is a first video data item or a second video data item (step S504), and generating slide show data for sequentially playing back the selected one or more video data items (step S505).

According to the method described above, an image data item (one example of the first video data item) that includes information on the generation date and time and the generation location of the image data item can be classified based on the generation date and time and the generation location of the image data item. In addition, a moving image data item (one example of the second video data item) that includes information indicating the generation date and time of the moving image data item and does not include information indicating the generation location of the moving image data item can be classified into the same group as a group to which an image data item whose generation date and time is close to the generation date and time of the moving image data item belongs. If the generation dates and times of video data items are close to each other, it is most likely that the video data items were generated at the same location. It is therefore easier, using such a classification method, to group video data items that were generated at the same location, i.e., video data items of the same event occurred in the same period. In other words, with the slide show generation method according to the present disclosure, it is possible to select video data items appropriate for playback.

For example, each of the plurality of video data items includes identification data indicating an imaging device that has generated the video data item. In this case, in the classifying of the second video data item, the second video data item is classified into the first group when (i) the generation date and time of the second video data item is between the generation dates and times, in chronological order, of any two first video data items among the plurality of first video data items belonging to the first group, and (ii) an imaging device indicated by identification data included in the second video data item is same as an imaging device indicated by identification data included in each of the plurality of first video data items belonging to the first group, for example.

When video data items were generated by the same imaging device, it is most likely that the video data items were generated at the same location. In other words, when video data items were generated by the same imaging device, it is most likely that the video data items are of the same event occurred in the same period. It is therefore possible to select video data items more appropriate for playback.

For example, the classifying of the first video data item includes: calculating a distance between a predetermined first location and the generation location of each of the plurality of first video data items among the plurality of video data items obtained in the obtaining. In this case, the classifying of the first video data item includes classifying a near-distance first video data item and a far-distance first video data item into different groups. The near-distance first video data item is a first video data item whose calculated distance is less than a predetermined first distance, and the far-distance first video data item is a first video data item whose calculated distance is at least the predetermined first distance.

Video data items generated at near distance are most likely to be of the same event occurred in the same period, compared with video data items generated at far distance. It is therefore possible to select video data items more appropriate for playback.

For example, the classifying of the first video data item includes classifying, into a second group, a third video data item among the plurality of video data items obtained in the obtaining, where the third video data item has a generation date and a generation location at least one of which is different from the generation date and the generation location of the plurality of first video data items belonging to the first group. For example, the classifying of the second video data item includes: when the generation date and time of the second video data item is, in chronological order, between the generation date and time of any one of the plurality of first video data items belonging to the first group and the generation date and time of any one of a plurality of third video data items which belong to the second group and each of which is the third video data item, classifying the second video data item into a group to which a video data item belongs, where the video data item is a video data item with a generation date and time closest to the generation date and time of the second video data item among a plurality of video data items each of which is classified into either the first group or the second group.

According to the above, after first video data items are classified, even when a second video data item was not generated between the generation dates and times, in chronological order, of any two first video data items among a plurality of first video data items in any one of groups, the second video data item can be classified into a group that includes a first video data item generated at a date and time close to the date and time of the second video data item.

For example, the slide show generation method according to the present disclosure further includes performing image analysis on each of the plurality of video data items to estimate the event type of the video data item (e.g., step S104). In this case, the classifying of the first video data item includes, for example, classifying, into a second group, a third video data item among the plurality of video data items obtained in the obtaining, where the third video data item has a generation date and a generation location at least one of which is different from the generation date and the generation location of the plurality of first video data items belonging to the first group. In this case, the classifying of the second video data item includes: when the generation date and time of the second video data item is, in chronological order, between the generation date and time of any one of the plurality of first video data items and the generation date and time of any one of a plurality of third video data items which belong to the second group and each of which is the third video data item, classifying the second video data item into a group to which a video data item belongs, where the video data item is a video data item with an event type that matches the event type of the second video data item at the highest concordance rate among a plurality of video data items each of which is classified into either the first group or the second group.

According to the above, after first video data items are classified, even when a second video data item was not generated between the generation dates and times, in chronological order, of any two first video data items among a plurality of first video data items in any one of groups, the second video data item can be classified into a group that includes many first video data items of the same event occurred in the same period.

For example, the slide show generation method according to the present disclosure further includes determining whether the total number of a plurality of video data items belonging to the first group is less than a predetermined number (e.g., steps S209 through S216). In this case, in the determining, when it is determined that the total number of the plurality of video data items belonging to the first group is less than the predetermined number (No in step S209), whether the generation location of the plurality of first video data items belonging to the first group is at least a predetermined second distance away from a predetermined second location is determined (e.g., step S210), for example. In the determining, when it is determined that the generation location of the plurality of first video data items belonging to the first group is at least the predetermined second distance away from the predetermined second location (Yes in step S210), for example, a video data item generated the next day or thereafter of the generation date of the plurality of video data items belonging to the first group is extracted from the plurality of video data items obtained in the obtaining (e.g., steps S211 and S212), and whether the generation location of the extracted video data item is same as the generation location of the plurality of first video data items belonging to the first group is determined (e.g., step S213). In the determining, when it is determined that the generation location of the extracted video data item is same as the generation location of the plurality of first video data items belonging to the first group (e.g., Yes in step S213), for example, the extracted video data item is classified into the first group (e.g., step S214).

When a slide show is generated for a group that includes an extremely small number of video data items, same video data items are frequently displayed in the slide show. In view of this, a group that includes an extremely small number of video data items should include one or more video data items generated on the next day or thereafter of the generation date of the video data items belonging to the group. If a video data item was generated at a location a certain distance away from the user's home, for example, the video data item can be classified into a group that includes many video data items of a roughly-classified event type such as a user's outing over a couple of days.

For example, the selecting and the generating includes: sequentially arranging, in chronological order, a plurality of video data items in the first group, starting from a video data item with the earliest generation date and time; dividing, into N periods, a total period from the generation date and time of the leading video data item until the generation date and time of the last video data item in the plurality of video data items arranged, where N is an integer of 2 or greater; generating a plurality of small sets into which the plurality of video data items that have been arranged are classified for each of the N periods in the total period (e.g., step S401 and FIG. 16); and selecting one or more video data items for each of the plurality of small sets that have been generated (e.g., steps S402 through S408 and FIG. 17).

When a slide show including all of video data items in a certain group to which an extremely large number of video data items belong is generated, it may take a long time to perform the slide show or the display time of each of the video data items may be extremely short. In view of this, by extracting a video data item for each of generated periods to generate a slide show, it is possible to generate a slide show using a plurality of video data items that are dispersed in terms of generation time, so that the slide show is not generated using only a plurality of video data items generated in a specific period. Such a slide show allows the user to easily look back the whole event while watching the slide show.

Alternatively, the selecting and the generating includes, for example: sequentially arranging, in chronological order, a plurality of video data items in the first group, starting from a video data item with the earliest generation date and time; generating a plurality of small sets into which the plurality of video data items that have been arranged are classified for every M video data items in order of the arrangement, where M is an integer of 2 or greater (e.g., step S401 and FIG. 15); and selecting one or more video data items for each of the plurality of small sets that have been generated (e.g., steps S402 through S408 and FIG. 17).

According also to the above, it is possible to generate a slide show using a plurality of video data items that are dispersed in terms of generation time, so that the slide show is not generated using only a plurality of video data items generated in a specific period. Such a slide show allows the user to easily look back the whole event while watching the slide show.

For example, in the selecting and the generating, when a plurality of video data items belonging to the first group include an image data item and a moving image data item (e.g., No in step S403), the moving image data item is selected with priority over the image data item (step S404).

A moving image data item is very likely to include more information than an image data item. It is therefore possible to generate a slide show with much information by selecting a moving image data item with priority over an image data item.

For example, the slide show generation method according to the present disclosure further includes performing image analysis on each of the plurality of video data items to estimate the event type of the video data item. In this case, in the selecting and the generating, a video data item is selected with priority, where the video data item is a video data item with an event type to which the largest number of video data items belong among the event types of a plurality of video data items belonging to the first group.

According to the above, even if a video data item with an event type totally different from the event type of the other video data items was included in a certain group, it would be possible to generate a slide show using video data items with the same event type and without selecting the video data item with the different event type.

For example, the slide show generation method according to the present disclosure further includes performing image analysis on each of the video data items to estimate the event type of the video data item. For example, in the selecting and the generating, when a predetermined number of video data items are selected from a plurality of video data items belonging to the first group: a half of the predetermined number of video data items are sequentially selected in descending order starting from a video data item with an event type to which the largest number of video data items belong among the event types of the plurality of video data items belonging to the first group; and the remaining half of the predetermined number of video data items are selected as video data items whose event types have not been selected as event types of the half of the predetermined number of video data items among the event types of the plurality of video data items belonging to the first group.

According to the above, video data items may include a video data item with an event type that cannot be identified by estimator 140. Even in such a case, generator 160 can select the remaining half of a predetermined number of video data items from among video data items that (i) include a video data item with an event type that has not been estimated and (ii) are not included in any event type to which a large number of video data items belong among the event types of video data items belonging to the first group.

For example, in the selecting and the generating, when a predetermined number of video data items are selected from a plurality of video data items belonging to the first group: the remaining half of the predetermined number of video data items are sequentially selected in ascending order starting from a video data item with an event type to which the smallest number of video data items belong among the event types of the plurality of video data items belonging to the first group.

For example, the user may participate in events during a day and capture images in each of the events. Video data items generated during the day may all belong to the same group depending on the number of the video data items. In this case, if video data items are sequentially selected starting from a video data item with an event type to which the largest number of video data items belong among the event types of video data items belonging to a certain group, for example, a video data item with an event type to which a small number of video data items belong may not be included in a slide show. In this case, considering whether the user can easily look back the day by watching the slide show, it is less easy for the user to look back the event of an event type to which a small number of video data items belong. In view of this, a half of a predetermined number of video data items are sequentially selected in descending order starting from a video data item with an event type to which the largest number of video data items belong among the event types of a plurality of video data items belonging to the first group, and the remaining half of the predetermined number of video data items are sequentially selected in ascending order starting from a video data item with an event type to which the smallest number of video data items belong among the event types of the plurality of video data items belonging to the first group. With this, it is possible to generate a slide show with which the user can easily look back also an event of an event type to which a small number of video data items belong.

For example, the present disclosure may be realized as a program for causing a computer to execute the slide show generation method according to the present disclosure.

Generic or specific aspects of the present disclosure may be implemented by a system, device, method, integrated circuit, or computer program. Alternatively, the aspects may be implemented by an optical disc, an HDD, or a computer-readable non-transitory recording medium such as a semiconductor memory that stores the computer program.

For example, slide show generation device 100 according to the embodiment includes: obtainer 120 that obtains a plurality of video data items; first classifier 151 that classifies, into a first group, a first video data item among the plurality of video data items obtained by obtainer 120, where a plurality of first video data items were generated at a generation location that is same among the plurality of first video data items on a generation date that is same among the plurality of first video data items, and each of the plurality of first video data items is the first video data item; second classifier 152 that classifies, into the first group, a second video data item among the plurality of video data items obtained by obtainer 120, where the second video data item is a video data item that does not include location information and was generated between the generation dates and times, in chronological order, of any two first video data items among the plurality of first video data items belonging to the first group, and the location information indicates the generation location of the video data item; and generator 160 that selects one or more video data items from among a plurality of video data items each of which is a first video data item or a second video data item, and generates slide show data for sequentially playing back the selected one or more video data items.

With this, the slide show generation device produces the same advantageous effects as those obtained by the above-described slide show generation method according to the present disclosure.

Other Embodiments

As described above, the foregoing has described an embodiment as an example of techniques disclosed in the present application. The techniques according to the present disclosure are not limited to this example, and are applicable to embodiments to which changes, replacements, additions, omissions, etc. have been made. It is also possible to combine the elements described in the above embodiment to form a new embodiment.

In view of this, the following shows examples of other embodiments.

For example, a wireless communication method between the slide show generation device and the imaging device is not specifically limited. Predetermined wireless communication standards such as Bluetooth (registered trademark), a wireless local area network (LAN), Wi-Fi (registered trademark), and ZigBee (registered trademark) are examples of the wireless communication method.

In the above embodiment, the slide show generation device obtains video data by, for example, communicating with the imaging device, but this is non-limiting. For example, the slide show generation device may obtain video data from a device not equipped with a function to generate video data, such as a server device or a universal serial bus (USB) memory.

All or part of elements that are processing units such as the controller, the classifier, and the generator included in the slide show generation device according to the present disclosure may be configured by dedicated hardware or may be implemented by executing a software program suitable for each of the elements. Each of the elements may be implemented by a program executor such as a central processing unit (CPU) or a processor reading and executing a software program recorded on a recording medium such as a hard disk drive (HDD) or a semiconductor memory.

Elements that are processing units such as the controller, the classifier, and the generator included in the slide show generation device according to the present disclosure may be configured by one or more electronic circuits. The one or more electronic circuits each may be a general-purpose circuit or a dedicated circuit.

The one or more electronic circuits may include, for example, a semiconductor device, an integrated circuit (IC), or large scale integration (LSI). The IC or LSI may be integrated into one chip or a plurality of chips. Although IC or LSI are terms used herein, the terms may be changed depending on the degree of integration and may be referred to as system LSI, very large scale integration (VLSI), or ultra large scale integration (ULSI). A field programmable gate array (FPGA) which is programmed after LSI is manufactured can be used for the same purpose.

Generic or specific aspects of the present disclosure may be implemented by a system, device, method, integrated circuit, or computer program. Alternatively, the generic or specific aspects may be realized by an optical disc, an HDD, or a computer-readable non-transitory recording medium such as a semiconductor memory that stores the computer program. For example, the present disclosure may be implemented as a program for causing a computer to execute the slide show generation method according to the embodiment described above. The program may be recorded on a computer-readable non-transitory recording medium such as a CD-ROM or may be distributed by a communication line such as the Internet.

As described above, the foregoing has described an embodiment as an example of techniques according to the present disclosure. For this reason, the attached drawings and the detailed description are provided.

Accordingly, elements illustrated in the attached drawings or described in the detailed description may include not only elements essential for problem solving, but also elements not essential for problem solving but necessary for exemplifying the techniques. These non-essential elements should not be instantly acknowledged as essential based on the fact that they are illustrated in the drawings or described in the description.

Since the embodiment described above is for showing examples of techniques according to the present disclosure, various modifications, replacements, additions, omissions, etc. can be made within the scope of the claims or equivalence thereof.

INDUSTRIAL APPLICABILITY

The present disclosure is applicable to, for example, recorders that obtain video data from a plurality of devices to generate slide show data.

The invention claimed is:

1. A slide show generation method comprising:
obtaining a plurality of video data items;
classifying, into a first group, a first video data item among the plurality of video data items obtained in the obtaining, a plurality of first video data items being generated at a generation location that is same among the plurality of first video data items on a generation date that is same among the plurality of first video data items, each of the plurality of first video data items being the first video data item;
classifying, into the first group, a second video data item among the plurality of video data items obtained in the obtaining, the second video data item being a video data item that does not include location information and was generated between generation dates and times, in chronological order, of any two first video data items among the plurality of first video data items belonging to the first group, the location information indicating a generation location of the video data item;
selecting one or more video data items from among a plurality of video data items each of which is the first video data item or the second video data item, and generating slide show data; and
sequentially playing back the one or more video data items selected, wherein:
the classifying of the first video data item includes:
calculating a distance between a predetermined first location and a generation location of each of the plurality of first video data items among the plurality of video data items obtained in the obtaining;
classifying a near-distance first video data item and a far-distance first video data item into different groups, the near-distance first video data item being the first video data item whose calculated distance is less than a predetermined first distance, the far-distance first video data item being the first video data item whose calculated distance is at least the predetermined first distance; and
classifying, into a second group, a third video data item among the plurality of video data items obtained in the obtaining, the third video data item having a generation date and a generation location at least one of which is different from the generation date and the generation location of the plurality of first video data items belonging to the first group, and
the classifying of the second video data item includes:
when a generation date and time of the second video data item is, in chronological order, between a generation date and time of any one of the plurality of first video data items belonging to the first group and a generation date and time of any one of a plurality of third video data items which belong to the second group and each of which is the third video data item, classifying the second video data item into a group to which a video data item belongs, the video data item being a video data item with a generation date and time closest to the generation date and time of the second video data item among a plurality of video data items each of which is classified into either the first group or the second group.

2. The slide show generation method according to claim 1, wherein
each of the plurality of video data items includes identification data indicating an imaging device that has generated the video data item, and
in the classifying of the second video data item, the second video data item is classified into the first group when (i) a generation date and time of the second video data item is between generation dates and times, in chronological order, of any two first video data items among the plurality of first video data items belonging to the first group, and (ii) an imaging device indicated by identification data included in the second video data item is same as an imaging device indicated by identification data included in each of the plurality of first video data items belonging to the first group.

3. The slide show generation method according to claim 1, further comprising:
determining whether a total number of a plurality of video data items belonging to the first group is less than a predetermined number, wherein
in the determining:
when it is determined that the total number of the plurality of video data items belonging to the first group is less than the predetermined number, determining whether the generation location of the plurality of first video data items belonging to the first group is at least a predetermined second distance away from a predetermined second location;
when it is determined that the generation location of the plurality of first video data items belonging to the first group is at least the predetermined second distance away from the predetermined second location, extracting, from the plurality of video data items obtained in the obtaining, the video data item generated a next day or thereafter of the generation date of the plurality of video data items belonging to the first group, and determining whether a generation location of the extracted video data item is same as the generation location of the plurality of first video data items belonging to the first group; and
when it is determined that the generation location of the extracted video data item is same as the generation location of the plurality of first video data items belonging to the first group, classifying the extracted video data item into the first group.

4. The slide show generation method according to claim 1, wherein
the selecting and the generating includes:
sequentially arranging, in chronological order, a plurality of video data items in the first group, starting from a video data item with an earliest generation date and time;
dividing, into N periods, a total period from a generation date and time of a leading video data item until a generation date and time of a last video data item in the plurality of video data items arranged, where N is an integer of 2 or greater;
generating a plurality of small sets into which the plurality of video data items arranged are classified for each of the N periods in the total period; and
selecting one or more video data items for each of the plurality of small sets generated.

5. The slide show generation method according to claim 1, wherein
the selecting and the generating includes:
sequentially arranging, in chronological order, a plurality of video data items in the first group, starting from a video data item with an earliest generation date and time;
generating a plurality of small sets into which the plurality of video data items arranged are classified for every M video data items in order of the arrangement, where M is an integer of 2 or greater; and
selecting one or more video data items for each of the plurality of small sets generated.

6. The slide show generation method according to claim 1, wherein
in the selecting and the generating, when a plurality of video data items belonging to the first group include an image data item and a moving image data item, the moving image data item is selected with priority over the image data item.

7. The slide show generation method according to claim 1, further comprising:
performing image analysis on each of the plurality of video data items to estimate an event type of the video data item, wherein
in the selecting and the generating, a video data item is selected with priority, the video data item being a video data item with an event type to which a largest number of video data items belong among event types of a plurality of video data items belonging to the first group.

8. The slide show generation method according to claim 1, further comprising:
performing image analysis on each of the video data items to estimate an event type of the video data item, wherein
in the selecting and the generating, when selecting a predetermined number of video data items from a plurality of video data items belonging to the first group:
a half of the predetermined number of video data items are sequentially selected in descending order starting from a video data item with an event type to which a largest number of video data items belong among event types of the plurality of video data items belonging to the first group; and
a remaining half of the predetermined number of video data items are selected as video data items whose event types have not been selected as event types of the half of the predetermined number of video data items among the event types of the plurality of video data items belonging to the first group.

9. The slide show generation method according to claim 8, wherein
in the selecting and the generating, the remaining half of the predetermined number of video data items are sequentially selected in ascending order starting from a video data item with an event type to which a smallest number of video data items belong among event types of the plurality of video data items belonging to the first group.

10. A computer-readable non-transitory recording medium having recorded thereon a program for causing a computer to execute the slide show generation method according to claim 1.

11. A slide show generation device comprising:
an obtainer that obtains a plurality of video data items;
a first classifier that classifies, into a first group, a first video data item among the plurality of video data items obtained by the obtainer, a plurality of first video data items being generated at a generation location that is same among the plurality of first video data items on a generation date that is same among the plurality of first video data items, each of the plurality of first video data items being the first video data item;
a second classifier that classifies, into the first group, a second video data item among the plurality of video data items obtained by the obtainer, the second video data item being a video data item that does not include location information and was generated between generation dates and times, in chronological order, of any two video data items among the plurality of first video data items belonging to the first group, the location information indicating a generation location of the video data item;

a generator that selects one or more video data items from among a plurality of video data items each of which is the first video data item or the second video data item, and generates slide show data; and a player that sequentially plays playing back the one or more video data items selected, wherein:

the first classifier:

calculates a distance between a predetermined first location and a generation location of each of the plurality of first video data items among the plurality of video data items obtained by the obtainer;

classifies a near-distance first video data item and a far-distance first video data item into different groups, the near-distance first video data item being the first video data item whose calculated distance is less than a predetermined first distance, the far-distance first video data item being the first video data item whose calculated distance is at least the predetermined first distance; and classifies, into a second group, a third video data item among the plurality of video data items obtained by the obtainer, the third video data item having a generation date and a generation location at least one of which is different from the generation date and the generation location of the plurality of first video data items belonging to the first group, and the second classifier:

when a generation date and time of the second video data item is, in chronological order, between a generation date and time of any one of the plurality of first video data items belonging to the first group and a generation date and time of any one of a plurality of third video data items which belong to the second group and each of which is the third video data item, classifies the second video data item into a group to which a video data item belongs, the video data item being a video data item with a generation date and time closest to the generation date and time of the second video data item among a plurality of video data items each of which is classified into either the first group or the second group.

12. A slide show generation method comprising:

obtaining a plurality of video data items;

performing image analysis on each of the plurality of video data items to estimate an event type of the video data item;

classifying, into a first group, a first video data item among the plurality of video data items obtained in the obtaining, a plurality of first video data items being generated at a generation location that is same among the plurality of first video data items on a generation date that is same among the plurality of first video data items, each of the plurality of first video data items being the first video data item;

classifying, into the first group, a second video data item among the plurality of video data items obtained in the obtaining, the second video data item being a video data item that does not include location information and was generated between generation dates and times, in chronological order, of any two first video data items among the plurality of first video data items belonging to the first group, the location information indicating a generation location of the video data item;

selecting one or more video data items from among a plurality of video data items each of which is the first video data item or the second video data item, and generating slide show data; and sequentially playing back the one or more video data items selected, wherein:

the classifying of the first video data item includes:

calculating a distance between a predetermined first location and a generation location of each of the plurality of first video data items among the plurality of video data items obtained in the obtaining;

classifying a near-distance first video data item and a far-distance first video data item into different groups, the near-distance first video data item being the first video data item whose calculated distance is less than a predetermined first distance, the far-distance first video data item being the first video data item whose calculated distance is at least the predetermined first distance; and classifying, into a second group, a third video data item among the plurality of video data items obtained in the obtaining, the third video data item having a generation date and a generation location at least one of which is different from the generation date and the generation location of the plurality of first video data items belonging to the first group, and the classifying of the second video data item includes:

when a generation date and time of the second video data item is, in chronological order, between a generation date and time of any one of the plurality of first video data items and a generation date and time of any one of a plurality of third video data items which belong to the second group and each of which is the third video data item, classifying the second video data item into a group to which a video data item belongs, the video data item being a video data item with an event type that matches an event type of the second video data item at a highest concordance rate among a plurality of video data items each of which is classified into either the first group or the second group.

13. A computer-readable non-transitory recording medium having recorded thereon a program for causing a computer to execute the slide show generation method according to claim 12.

14. A slide show generation device comprising:

an obtainer that obtains a plurality of video data items;

an estimator that performs image analysis on each of the plurality of video data items to estimate an event type of the video data item;

a first classifier that classifies, into a first group, a first video data item among the plurality of video data items obtained by the obtainer, a plurality of first video data items being generated at a generation location that is same among the plurality of first video data items on a generation date that is same among the plurality of first video data items, each of the plurality of first video data items being the first video data item;

a second classifier that classifies, into the first group, a second video data item among the plurality of video data items obtained by the obtainer, the second video data item being a video data item that does not include location information and was generated between generation dates and times, in chronological order, of any two first video data items among the plurality of first video data items belonging to the first group, the location information indicating a generation location of the video data item;

a generator that selects one or more video data items from among a plurality of video data items each of which is the first video data item or the second video data item, and generates slide show data; and a player that sequentially plays back the one or more video data items selected, wherein:

the first classifier:

calculates a distance between a predetermined first location and a generation location of each of the plurality of first video data items among the plurality of video data items obtained by the obtainer;

classifies a near-distance first video data item and a far-distance first video data item into different groups, the near-distance first video data item being the first video data item whose calculated distance is less than a predetermined first distance, the far-distance first video data item being the first video data item whose calculated distance is at least the predetermined first distance; and classifies, into a second group, a third video data item among the plurality of video data items obtained by the obtainer, the third video data item having a generation date and a generation location at least one of which is different from the generation date and the generation location of the plurality of first video data items belonging to the first group, and the second classifier:

when a generation date and time of the second video data item is, in chronological order, between a generation date and time of any one of the plurality of first video data items and a generation date and time of any one of a plurality of third video data items which belong to the second group and each of which is the third video data item, classifies the second video data item into a group to which a video data item belongs, the video data item being a video data item with an event type that matches an event type of the second video data item at a highest concordance rate among a plurality of video data items each of which is classified into either the first group or the second group.

\* \* \* \* \*